US009369638B2

(12) United States Patent  
Saban et al.

(10) Patent No.: US 9,369,638 B2  
(45) Date of Patent: Jun. 14, 2016

(54) METHODS FOR EXTRACTING OBJECTS FROM DIGITAL IMAGES AND FOR PERFORMING COLOR CHANGE ON THE OBJECT

(71) Applicant: EyesMatch Ltd., Road Town, Tortola (VG)

(72) Inventors: Ofer Saban, Vienna, VA (US); Nissi Vilcovsky, Tokyo (JP)

(73) Assignee: EYESMATCH LTD, Road Town, Tortola (VG)

( * ) Notice: Subject to any disclaimer, the term of this patent is extended or adjusted under 35 U.S.C. 154(b) by 0 days.

(21) Appl. No.: 14/948,199

(22) Filed: Nov. 20, 2015

(65) Prior Publication Data

US 2016/0080662 A1    Mar. 17, 2016

Related U.S. Application Data

(63) Continuation of application No. 14/253,819, filed on Apr. 15, 2014, now Pat. No. 9,269,157, which is a continuation-in-part of application No. 13/843,001, filed on Mar. 15, 2013, now Pat. No. 8,982,109, which is a continuation-in-part of application No. 13/088,369, filed on Apr. 17, 2011, now Pat. No. 8,624,883, which is a continuation of application No. 11/817,411, filed as application No. PCT/IL2006/000281 on Mar. 1, 2006, now Pat. No. 7,948,481.

(60) Provisional application No. 60/656,885, filed on Mar. 1, 2005, provisional application No. 60/656,884, filed on Mar. 1, 2005, provisional application No. 61/738,957, filed on Dec. 18, 2012, provisional application No. 61/892,368, filed on Oct. 17, 2013, provisional application No. 61/862,025, filed on Aug. 4, 2013.

(51) Int. Cl.
*G06F 3/038* (2013.01)  
*H04N 5/272* (2006.01)  
*H04N 5/232* (2006.01)  
*H04N 9/87* (2006.01)  
*H04N 5/262* (2006.01)  
*G06F 3/00* (2006.01)  
*G06F 3/01* (2006.01)

(52) U.S. Cl.
CPC .............. *H04N 5/272* (2013.01); *G06F 3/005* (2013.01); *G06F 3/011* (2013.01); *H04N 5/23293* (2013.01); *H04N 5/2624* (2013.01); *H04N 9/87* (2013.01)

(58) Field of Classification Search
CPC ............ G06F 3/005; G06F 3/01; G06F 3/011  
USPC ............... 345/204–215; 348/333.01; 434/395  
See application file for complete search history.

(56) References Cited

U.S. PATENT DOCUMENTS

| 7,948,481 | B2* | 5/2011 | Vilcovsky | ................ G02B 5/08 345/204 |
| 8,624,883 | B2* | 1/2014 | Vilcovsky | ................ G02B 5/08 345/204 |
| 8,982,109 | B2* | 3/2015 | Vilcovsky | .............. H04N 7/144 345/204 |
| 9,269,157 | B2* | 2/2016 | Saban | .......................... 345/204 |

*Primary Examiner* — Vijay Shankar  
(74) *Attorney, Agent, or Firm* — Nixon Peabody LLP; Joseph Beach, Esq.

(57) ABSTRACT

Operating a system displaying a mirror-mimicking image on the monitor to enable a user to try a clothing item, by: obtaining digital images of a live video feed of length of N seconds from the camera; saving the digital images in the memory; flipping the images about a vertical axis so as to reverse right and left sides of the image; applying a transformation mapping to the images to modify the images such that they appear to mimic a reflection of a mirror, to thereby obtain transformed images; displaying the transformed images on the monitor to thereby replay the video feed of N seconds using the transformed images; wherein the length of N seconds is configured to be enough time to allow the user to get a good impression on the way the clothing item looks.

22 Claims, 16 Drawing Sheets

Endomorph    Mesomorph    Ectomorph

Banana    Apple    Pear    Hourglass

METHODS FOR EXTRACTING OBJECTS FROM DIGITAL IMAGES AND FOR PERFORMING COLOR CHANGE ON THE OBJECT

CROSS-REFERENCE(S) TO RELATED APPLICATIONS

This application is a Continuation of and claims the benefit of, U.S. patent application Ser. No. 14/253,819, filed Apr. 15, 2014, which is a Continuation-in-Part of U.S. application Ser. No. 13/843,001, filed Mar. 15, 2013 (now U.S. Pat. No. 8,982, 109 issued Mar. 17, 2015), which is a Continuation-in-Part of U.S. application Ser. No. 13/088,369, filed Apr. 17, 2011 (now U.S. Pat. No. 8,624,883 issued Jan. 7, 2014), which is a continuation of U.S. patent application Ser. No. 11/817,411, filed Aug. 30, 2007 (now U.S. Pat. No. 7,948,481 issued May 24, 2011), which is a National Phase Application of PCT International Application No. PCT/IL2006/000281, International Filing Date Mar. 1, 2006, which claims the benefit of U.S. Provisional Application No. 60/656,884, filed Mar. 1, 2005 and U.S. Provisional Application No. 60/656,885, filed Mar. 1, 2005. U.S. patent application Ser. No. 13/843,001 further claims the priority benefit of U.S. Provisional Application No. 61/738,957, filed Dec. 18, 2012. U.S. patent application Ser. No. 14/253,819 further claims the priority benefit of U.S. Provisional Application No. 61/892,368, filed Oct. 17, 2013 and U.S. Provisional Application No. 61/862,025, filed Aug. 4, 2013. The entire disclosures of all of the above listed applications are incorporated herein by reference.

TECHNICAL FIELD

The invention relates generally to imaging and display systems and, more particularly, to monitors, and interactive displays, e.g., in retail and/or service environments, medical or home situations, video conferencing, gaming, and the like. Specific implementations relate to virtualizing a mirror in situations where users expect to see a mirror, e.g., in trying on apparel. Another specific implementation relate to situations where a natural appearance is preferable over standard video image, such as in, e.g., video conferencing.

BACKGROUND

The conventional mirror (i.e., reflective surface) is the common and most reliable tool for an individual to explore actual self-appearance, in real time. A few alternatives have been proposed around the combination of a camera and a screen to replace the conventional mirror. However, these techniques are not convincing and are not yet accepted as a reliable image of the individual as if he was looking at himself in a conventional mirror. This is mainly because the image generated by a camera is very different from an image generated by a mirror.

In U.S. application Ser. No. 13/843,001, we proposed a novel technology (computerized method) to address the challenges of converting and transforming a still image or 2D/3D video created by one or more cameras, with or without other sensors, into a mirror or video conference experience.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

In this disclosure we describe a computerized technique that takes a video, a still, or a group of still images, before or after the transformation described in U.S. application Ser. No. 13/843,001, and continue the computerized method to address additional functionalities, such as user interface, augmented reality, color change, texture change, shape manipulation of an object, body or background, and more. In addition, the calibrated virtual camera approach allows for body line, body curve and body type measurements from a 2D or 3D image or video.

For the augmented reality capabilities, first a 2D and/or 3D model or mask will be created for one or more items or elements (e.g., shirt, dress, pants, head, shoe, glass, entire body, and the like), then the model or mask manipulation can enable the augmented reality features like color, texture replacement and manipulation, or geometric measurement, or complete object replacement. The disclosed technique is differentiated from other techniques that are using only 3D camera (IR or dual camera). In the following disclosed techniques one can build the model from a single regular camera and can improve the results with multiple cameras and additional information from IR, 3D camera or other sensors and information regarding the object sought to be manipulated.

Some embodiments can include multi-level user identification. Specifically, the embodiments can include face recognition improvement, user learning, and adaptation. Known methods of face recognition can utilize algorithms that can be very sensitive to face pose. In the present technique, a smooth experience of face pose can be created to accommodate different camera locations and angles.

Various embodiments can include code identification, e.g., quick recognition (QR) code, 1D Code, hidden code and the like. The embodiments can be adapted to discover codes from a relatively long distance with a relatively small image as compared to the image under projection or under other optic distortion. Also, it may include wireless identification, e.g., NFC, WiFi wideband, microwave 3D, body access network (BAN) chip and the like. Wireless identification can be made from a mobile device, watch glass, microchip or any other carry on device or microchip. Other body measurement techniques may include fingerprinting, body identification, body type, eyes, palm recognition, X-ray correlation, body temperature, body pulse, blood pressure and the like.

In another aspect a user interface and methods to control and operate manually or automatically the virtual mirror capabilities are described.

In additional embodiments the product mechanical design and appearance are disclosed, to enhance the usability and functionality and the user experience overall.

In some embodiments, a non-transitory computer-readable storage medium for operating a monitor, a camera, and a processor, is provided and configured so as to display a mirror-mimicking image on the monitor, and comprising: on a device having the processor and a memory, storing a program for execution by the processor, the program including instructions for: capturing an image or video from the system; calibrating the image or video based on a user tracking system; detecting an edge of an object present in the captured image or video; measuring a characteristic of the object; and creating a measurement signature of the object. In some embodiments, computer implemented method for operating a system having a monitor, a camera, and a processor is provided and configured so as to display a user's image on the monitor, and comprising: on a device having the processor and a memory storing a program for execution by the processor, the program including instructions for: capturing an image or video from the system; identifying an element from the image or video; selecting the identified element; rendering an original model of the selected element; selecting a new appearance for the selected element; and rendering a new model based on the original model and the selected new appearance for the element. The processor performs distortion transformation that comprises operation to generate a user experience that simulates the user looking into a traditional reflective mirror. The distortion transformation may include the steps: obtaining a digital image from the camera; flipping the image about a vertical axis so as to reverse right and left sides of the image; applying a transformation mapping to the image to modify the image such that it appears to mimic a reflection of a mirror; resizing the image to reduce variations caused by changes in the object's distance to the camera; and displaying the image on the monitor after performing the flipping, transformation mapping, and resizing.

In another aspect, a computerized method includes instructions for at least one from the group consisting of: complex stitching based on a user's point of view and a location in front of the monitor; image or video analyzing to better utilize an inventory of a store and to support an ecommerce platform; correcting optical distortion of the image or video; utilization of multiple cameras to provide additional information; and presentation of the model locally or at a remote location on a mobile device or on a stationary monitor.

In a further aspect, a method for obtaining measurements of selected object in the image comprises at least one from the group consisting of: measuring in pixels and transforming the measured pixels to a known unit of measurement based on a perimeter model, multiple 2D cuts, a 3D model, statistical optimization, comparison with a previously obtained set of measurements pertaining to the user, determination of a point of focus for the measuring based on one or more characteristics of the user, determination of a point of focus for the measuring based on a height of the user, determination of a point of focus for the measuring based on a gender of the user, determination of a zone corresponding to the likely bust/chest of the user based on a height and gender of the user, and determination of a zone corresponding to the likely navel of the user based on a height and gender of the user.

In other aspects, a method for creating a measurement signature of an object in the image comprises at least one from the group consisting of: storing analyzed data as a vector with weighting allowing for single or multiple attribute scoring comparisons between users, recording a processed image for future comparison, recording a processed image for future deduction of additional information, recording a processed image to allow for future image correlation techniques, addition of pointers to the image to facilitate correlation, and addition of lines to the image to facilitate correlation.

BRIEF DESCRIPTION OF THE DRAWINGS

The accompanying drawings, which are incorporated into this specification, illustrate one or more exemplary embodiments of the inventions disclosed herein and, together with the detailed description, serve to explain the principles and exemplary implementations of these inventions. One of skill in the art will understand that the drawings are illustrative only, and that what is depicted therein may be adapted based on the text of the specification and the spirit and scope of the teachings herein.

In the drawings, where like reference numerals refer to like reference in the specification.

DETAILED DESCRIPTION

Figure 1:
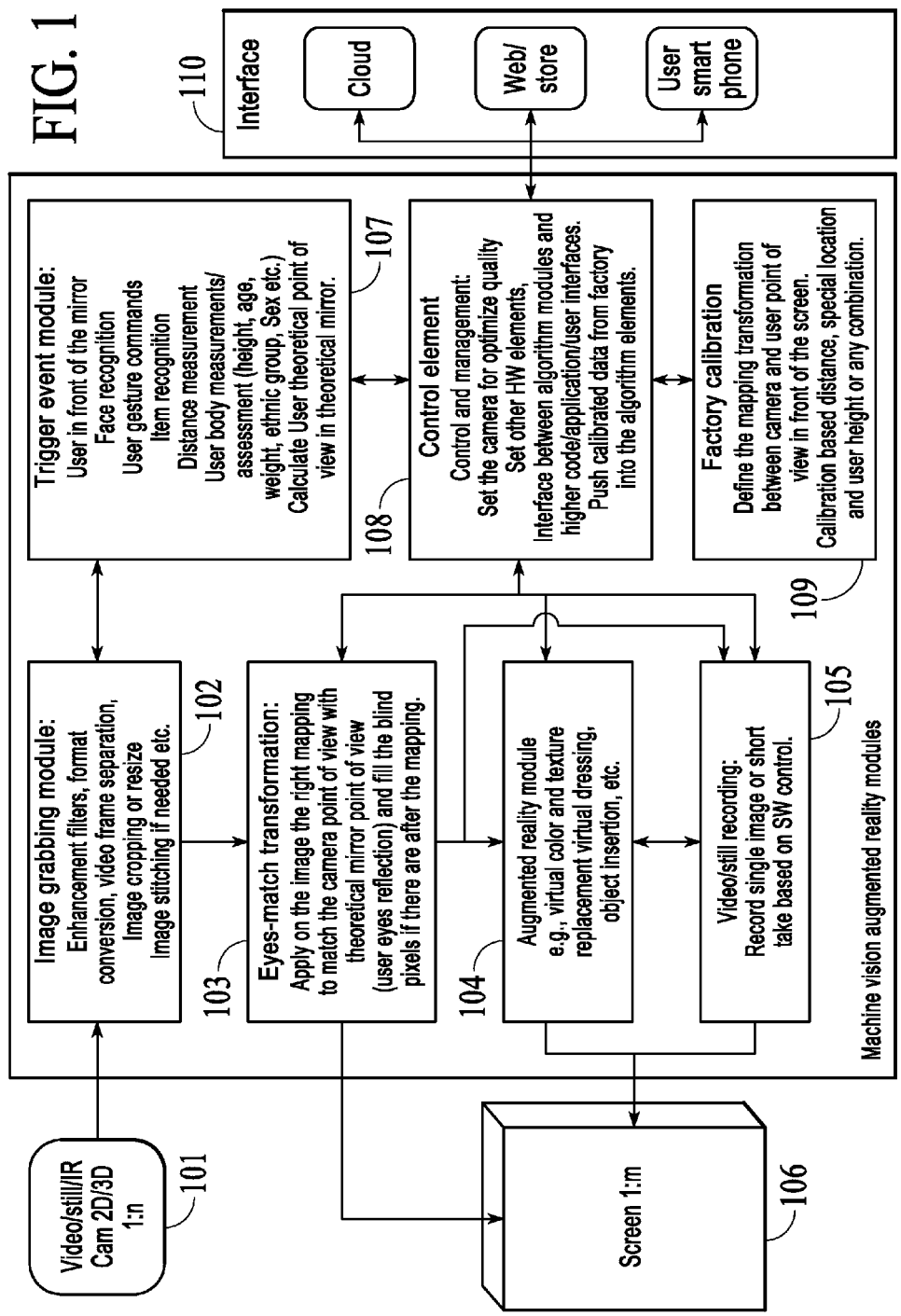
FIG. 1 illustrates an embodiment for augmented reality to simulate a mirror appearance on a flat screen display.

The following examples illustrate some embodiments and aspects of the invention. It will be apparent to those skilled in the relevant art that various modifications, additions, substitutions, and the like can be performed without altering the spirit or scope of the invention, and such modifications and variations are encompassed within the scope of the invention as defined in the claims which follow. The following examples do not in any way limit the invention. For ease of comprehending the various embodiments, the description includes description of various features under specific headings. However, these features may be implemented individually or in a mix-and-match fashion so as to take advantage of specific feature(s) for specific application.

General Overview

Embodiments of the present invention utilize a camera and a flat panel display to provide the user with the experience of looking at a mirror. That is, the image stream from the camera is manipulated and transformed such that when it is displayed on the screen, it appears to mimic a reflection in a mirror, rather than a recorded video stream. Since the "virtual mirror" image is digitally produced, it can be stored and manipulated to provide further enhancement features. For example, the image can be manipulated to change colors, to enable multilevel user identification and authentication, and to enable body measurements. The system includes a calibrated camera, such that the system is capable of providing augmented reality features, for example, color, texture, shape manipulation of body items or background in, e.g., a virtual mirror or video conference applications. It is also capable of performing body measurements and body monitoring for commercial, security, and healthcare applications.

Regarding the hardware, various embodiments may include single or multiple cameras from all types of sensors, including but not limited to, CCD, CMOS, IR CMOS and the like, and format protocols including HDMI, Firewire, USB, IP, HDbaseT wireless and the like, and any available resolutions including HD, regular SIF, 4k, 8k and the like. The display can include single or multiple screens or virtual screen, and regular screens in all sizes, shapes and proportions. The display can include mirror like screens, smartphones or tablets, projectors, holograms, 3D screens, Google glass, projector head mount display (HMD), glass (with switchable obscure layer) and the like.

In the disclosed embodiments the camera can be located anywhere. A best practice is to provide the camera above the screen facing the user. Additional locations can include the bottom of the screen, the sides of the screen or behind the screen if the screen is a bidirectional screen. In the case of 3D, two cameras can, for example, be provided at the top and side by side, which can provide superior results and ease the computerized method. Also, 3D can be manipulated from a single camera once the user is moving and/or rotating.

The embodiments can include a computerized method to cover a full body or a partial body, and different scaling per user selection (e.g., correction of head and/or eyes, direction of view/point of view and the like).

Each of the disclosed embodiments can be provided over a 2D or 3D still hard copy image, a 2D or 3D still digital image, over analog/digital video that was recorded by analog/digital camera or by frame grabber HDMI (or equivalent), IP, USB, Firewire (wired or wireless link) and the like. Each of the disclosed embodiments can be provided over digital streaming video that can be delivered to a computing device over any suitable communication method such as USB, HDMI, IP cat-5/fiber, WLAN, Firewire, HDbaseT, any combination of the above on a single cable or on multiple cables. Each of the disclosed embodiments can be provided when the computing device resides in the camera, in the screen, in the cloud, or in a computer including a workstation, server and the like.

Each of the disclosed embodiments can be provided when the computing device is distributed between the system elements, e.g., the computerized method can reside partially in the camera, partially in the video acquisition element, partially in the screen graphic processing unit (GPU), partially in the cloud, partially in the user smartphone device or any suitable combination thereof. Each of the disclosed embodiments can be provided when the computing device resides in a smartphone, tablet, notebook, screen, camera, HMD, Google glass and the like.

Each of the disclosed embodiments can be provided when the video is preprocessed to extract a 3D model of a selected item, where the preselecting can be done manually by the user or automatically by applying rules for selection. The model extraction can be performed locally by DSP/CPU next to the camera, in the cloud or in the user application on the user's device. It is more efficient to extract the model in a GPU (graphics processing unit) for a single object or a still image; in this case, a regular CPU can be sufficient.

Each of the disclosed embodiments can be provided when the rendering is being performed locally in the augmented reality station, in the cloud, or at the user mobile device. The rendering may be performed in the GPU for a single image or a very short video; in these cases, a CPU can provide sufficient performance.

Each of the disclosed embodiments can be provided when enhanced rendering techniques are performed to improve video quality, e.g., interpolating the object and the image to higher resolution and decimating after combining to smooth the edges and eliminate an aliasing effect. The present invention can eliminate flickering edges, e.g., by smoothing the model frame by frame, by eliminating the allowed changes per frame on the edges, by smoothing edges per frame, by applying averaging filters on single or multiple frames, and the like. Additional improvements can be achieved by increasing the frame rate and applying additional smoothing technique on the added frame to smooth the effect that would occur on the original frame rate.

Each of the disclosed embodiments can be provided regardless of whether screen resides near the camera. For example, the screen can be located in a control room. A camera main stream or recorded information can be accessed via remote control, via other address directly with physical infrastructure, or over the cloud.

In one embodiment the control on the station functionality can be through a gesture, eye movement, palm movement, finger movement or brain control. The present invention can be controlled with additional accessories like a laser beam pointer, voice control, wireless, or ultrasound tracing.

Segmentation

Accurate segmentation of objects and/or elements out of an image or video is one of the biggest challenges in the present field. Known techniques for solving this problem involved a clear tradeoff between accuracy and speed. Prior to the present invention, there is no satisfactory solution to the problem. Use of an infrared (IR) camera with three-dimensional (3D) depth measurement is one approach in the industry; however, quality of the approach suffers. For example, edges, image distortion, and/or low resolution misalignment between the IR and regular cameras prevent successful and convincing segmentation. Chromatic separation and edge detection techniques are very demanding from a computer resource perspective and do not yield a consistent performance. Some techniques to extract a user or object assume, for example, a green background that is easy to be distinguished, though not applicable in applications where the green background is not available.

Once a model of the item or items to be manipulated is obtained, a second problem is to create a smooth rendering flow that will update the model and will render it smoothly back into the original video or into other augmented reality video with the new information. The following disclosed embodiments achieve a smooth rendering flow relatively fast with high quality, so the manipulation can be done in real-time, in semi-real-time, or relatively fast, depending on the requirement of the particular application. Also, the embodiments are adapted to manipulate the items (color, texture, shape) in real time, on camera main stream feed, or off-line on user recorded videos.

Based on the model, the mask, and/or alpha channel per object from a video, user movement is learned and different objects to fit or not to fit with the object shape and form can be installed in a convincing manner. The disclosed embodiments can be distinguished from prior techniques, which attempt to do everything virtually. The embodiments can include manipulation with a mask to cover other changes such as different cloth, the changing face of a user, a change of the user's body type, elimination of a user from an image and the like.

Another disclosed feature is cloth recognition, which can identify the items and the clothes the user is wearing. For example, it can include a hidden code or information in the fabric.

Other features and embodiments may include: a microwave scanner, where the microwave sensor is integrated in the screen; body measurement features including, e.g., 2D and 3D body line detection or 2D/3D model/mask generation out of a video; analytic conclusion from the measurements, e.g., body type, origin, sex, age, suggested sizes of clothes, suggested diet or treatment and the like; body line tracking over time for diagnosis, identification of changes, user identification, and the like.

In some embodiments, the main camera stream can be manipulated in real time to change the appearance of the user, or to completely make him disappear from the video or image. In this scenario, the camera DSP or separate DSP or GPU capable device needs to get the camera stream and process the camera stream via remote control center and package it again as a camera main stream. A parallel computing to the camera main stream (sniffer) is also an option in one embodiment.

Provided below are several examples of additional applications that can leverage the technology of the present invention. Specifically, base video transformation can be used to create reliable virtual dressing.

Base video transformation can be used to create a reliable video conference when the user/users on the other side of the line can see the participant as if the participant were looking directly at them, rather than having an image from the viewpoint of the camera. Alternately, transformation can be used to create an image as if a user were looking into the eyes of another user in order to provide a convincing, live experience.

Base video transformation for augmented reality can be provided for multiple purposes including though not limited to: body manipulation and resizing, body measurements, medical diagnostic/monitoring/training and/or tracking, gaming, dressing, dating, meetings, security, full body simulators, dancing training, hair dressing, makeup, general training, traveling, and the like.

The embodiments can be applied for video conference or gaming where the user would like to change his appearance (e.g., skin complexion, dressing, face, and the like). According to the present invention, the model can allow a smooth change into a desired appearance or even create an image whereby the user disappears from the video.

The embodiments can be used in a security application, with accurate face recognition over calibrated EyesMatch (see, U.S. application Ser. No. 13/843,001) when the camera is located with projection perspective to the user's eyes, with Dynamic QR (quick response) code recognition (e.g., authorization and management of user access via Mobile Application, or badge, QR code can be generated for the mobile application from the cloud and can be verified by user authentication in the application), with full body recognition, scanning, and learning, with item recognition (e.g., clothes, uniform, badge, and the like), with a wireless sniffer (e.g., WiFi, Cellular, ultrasound and the like), with API to a security database, with location systems, with public information and the like. The embodiments can be used with a threat prevention action based on recognition of a specified activity (e.g., lock door, turn on/off a light, release fog, shooting machine, e.g., electrical shock, bullets, paper and the like). Due to the geometry of the calibrated image, the location of the target in the image can be measured very accurately and can be used to operate an accurate attack on a target efficiently without risking others.

Real time and offline appearance registration and comparison can be provided so a user can follow up appearance changes over time and over the years. These processes can be provided for multiple purposes including medical registration, which can be over a given period of time, between multiple examinations, using multiple/different sensors, e.g., for temperature, blood pressure, and the like.

In some embodiments, the calibrated camera/multiple cameras with/without complementary information from other sensors can be used for patient diagnostic and patient monitoring. For example, though not limited, the present invention can be used to monitor and alert for skin problems like skin cancer melanoma, breast changes that can suggest further testing for breast cancer, heart rate and blood pressure measurement, temperature of the patient, halo of the user, skin and finger nail recording monitoring for changes, eye problems, spin, bones, muscles and body flexibility trends and changes.

Augmented Reality Platform

FIG. 1 is a system block diagram for an augmented reality platform supporting a real-time or recorded video/image processing. The system can include one or a plurality (1:n) of input devices 101, including a video camera, a still camera, an IR camera, a 2D camera or a 3D camera. The input device 101 can be adapted to send information to one or more machine vision augmented reality modules 102, 103, 104, 105, 107, 108 and 109. The one or more machine vision augmented reality modules 102, 103, 104, 105, 107, 108 and 109 can be adapted to send information to one or a plurality (1:m) of screens 106. The one or more machine vision augmented reality modules 102, 103, 104, 105, 107, 108 and 109 can be adapted to send/receive information to/from an interface or user interface module 110. The interface 110 can be adapted to send/receive information to/from one or more of a cloud, a web/store or a user device, e.g., smart phone or tablet.

The one or more machine vision augmented reality modules 102, 103, 104, 105, 107, 108 and 109 can include an image grabbing module 102, an eyes-match transformation module 103, an augmented reality module 104, a video/still recording module 105, a trigger event module 107, a control element module 108, and a factory calibration module 109.

The image grabbing module 102 can include one or more of the following features: enhancement filters, format conversion, video frame separation, image cropping, image resizing, image stitching and the like. The image grabbing module 102 can be adapted to send information to the eyes-match transformation module 103. The image grabbing module 102 can be adapted to send/receive information to/from the trigger event module 107.

The eyes-match transformation module 103 can be adapted to apply on the image the right mapping to match the camera point of view with theoretical mirror point of view (user eyes reflection) and fill the blind pixels if there are any after the mapping. The eyes-match transformation module 103 can be adapted to send information to the augmented reality module 104 and/or the video/still recording module 105. Also, the eyes-match transformation module 103 can be adapted to send/receive information to/from the control element module 108. Further, the eyes-match transformation module 103 can be adapted to send information to the one or plurality of screens 106, to display an image that mimics a reflection of a mirror.

The augmented reality module 104 can be adapted, for example, to provide virtual color and texture replacement, virtual dressing, object insertion and the like. The augmented reality module 104 can be adapted to send/receive information to/from the control element module 108 and/or the video/still recording module 105. Also, the augmented reality module 104 can be adapted to send information to the one or plurality of screens 106 to display an image that mimics a reflection of a mirror that is modified by the changes produced by the augmented reality module 104.

The video/still recording module 105 can be adapted to record a single image (frame) or a short take based on software control. The video/still recording module 105 can be adapted to send/receive information to/from the control element module 108. Also, the video/still recording module 105 can be adapted to send information to the one or plurality of screens 106.

The trigger event module 107 can include one or more of the following features: recognition of a user in front of the mirror, face recognition, recognition of user gesture commands, item recognition, distance measurement, user body measurements/assessments (including, e.g., height, age, weight, ethnic group, sex, and the like) and calculation of user theoretical point of view in theoretical mirror. The trigger event module 107 can be adapted to send/receive information to/from the control element module 108.

The control element module 108 can include one or more of the following features: control and management for setting the camera to optimize quality, for setting other hardware elements, an interface between algorithm modules and higher code/application/user interfaces, and push calibrated data from factory into the algorithm elements. The control element module can be adapted to send/receive information to/from the factory calibration module 109.

The factory calibration module 109 can be adapted to define the mapping transformation between the camera and the user point of view in front of the screen. Also, factory calibration module 109 can be adapted to calibrate the image based on distance, a special location (e.g., markings on the floor), user height or any combination thereof.

FIG. 1 and the following description represents just example of one embodiment of the present invention; other flows or functionalities can be allocated between the modules, represent additional embodiments that are part of the invention. The present inventors propose two methods to enable the augmented reality capabilities (real-time and offline). Both methods wrap the augmented reality module 104 with real image or video data that is real-time or was taken post processing via, e.g., eyes-match transformation module 103. That is, the image that is operated upon by the augmented reality module 104 may be a transformed image that represents a mirror reflection of a user.

One feature is that a user can define manually or automatically (via, e.g., interface 110) rules regarding what items the user would like to process and manipulate and what is the expected end result, e.g., an automated rule can be something like automatic identification of a user's shirt, which can be automatically or manually changed to a different color, or a user selecting a shirt via manual selection with a touch screen and manual color selection. Then, the selected object can be processed and extracted/segmented out and recorded to the database linked to the original recorded video or image. The augmented reality module 104 can then process the model/mask in real-time at a given frame rate, which can be at a lower or higher frame rate than the original, and at the same or a different size than the original. Some applications do not require (but can nonetheless include) live augmented reality, like trying-on clothes when the user would like to see himself with the modification (one or more options). Once the extracted object from the live scene is saved, it is easier to render multiple changes (color, texture, size, and the like). In addition, it is easier to perform a longer process, much more accurately, with higher quality and utilizing a process that yields more information, e.g., user movement, body measurements, and quality based on frame integration and the like. For other applications that require real-time processes, like a video conference, the second option is better to use. With the second option, the performance should be adapted to be as close as possible to the actual frame rate of the camera in order to avoid introduction of delay/lagging that can yield frame drops and poor performances. If delays/lagging are encountered, then such delays/lagging can be managed in a way that yields a smooth video without lagging of the frames. Such management can be achieved with buffers, image timestamps plus some delay, or with timestamps and frame reschedules for rendering.

For video input, it is highly recommended that the rendering process be done in a DSP or GPU device in order to avoid introduction of delay into the video. The creation of the mask/model can be done for the first option (not real-time) in a CPU as well. For the second option, the mask/model can be performed and calculated in the GPU/DSP as well.

In the trigger event module 107, some of the trigger functionality can be completely automated, e.g., a process can be started if face detection or presence detection is made. Some of the triggers can be performed in a semi-automated fashion from the user interface module 110, which can include any way to control the computerized device. Some of the functionality of the trigger event is to calculate the image transformation based on geometric information, calibration, and/or real-time user tracking, e.g., location of the user, eyes, head, hands, position, movement and the like. The tracking can be done using one or more techniques such as background substation, pattern recognition, color segmentation, and the like. The transformation tracking calculation functionality can also be implemented in the other modules.

The control element module 108 can be adapted to configure the system setup, camera device, authentication and the like, and can also provide information from the tracking transformation function into actual geometry transformation module or augmented reality module and the like.

With the factory calibration module 109, some of the information needed to calculate the transformation to be applied on the image/video can be generated during factory calibration or can be calculated based on additional information on the actual orientation of the camera in the field, e.g., height above the floor or desk and the like, 3D point of view, lens field of view (FOV), and the like. The factory information plus the actual geometry of the implementation can be processed and delivered to the right element in the system that will use the information for better calibration and accuracy.

In addition to application to a local screen for a mirror application, the present invention can be used to send the video plus the means to transform it or the actual manipulated and transformed video to another address in the cloud or locally as a single or bidirectional video conference.

Figure 2:
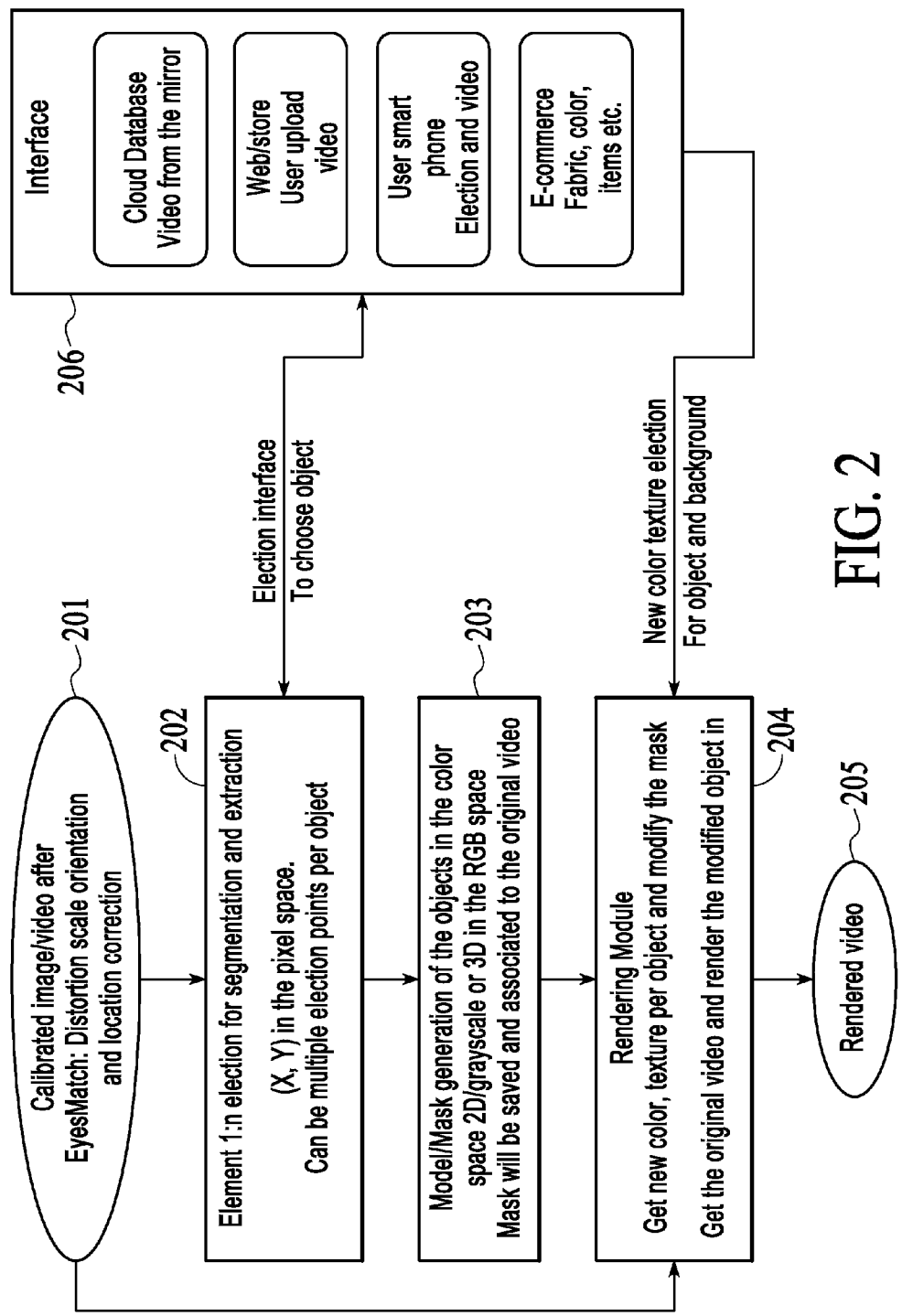
FIG. 2 illustrates an embodiment of an augmented reality module.

FIG. 2 depicts an example of an augmented reality module, which can correspond with the augmented reality module 104 described above. Specifically, the augmented reality module can have a function of allowing a user to virtually dress themselves, change appearances, such as color, accessories, etc. In this embodiment, the system obtains input image or video from, for example, the EyesMatch computerized method 201, or from any other image/video source, e.g., user smartphone, security camera, Google glass, mobile camera or stationary camera. Additional embodiments can include additional geometric information that will help to calculate proportion like user height, gaze and the like. If the user video or image is coming from the EyesMatch module (calibrated image/video), a more comprehensive model can be created that allows for body measurements, object pose, size, highly accurate orientation detection and the like. The additional information that can be calculated from the calibrated object or video can allow for object fitting, object replacement and insertion of new objects into the frame/video, since any distortion introduced by the location and field of view of the camera has been accounted for and corrected. These corrections enable highly accurate measurements of the user height, waist, etc., and fitting of the user's body to generally classified body types.

The election module 202 can obtain election information from interface 206, manually from the user (X,Y or name of object) or automatically from an electing method, e.g., a mechanism that can automatically detect predefined objects like pants, dress shirts and the like. For example, the interface 206 may enable the user to select a garment to be changed, e.g., change color of fabric type. This election is sent to the election module 202, so that the proper item to be modified is extracted from the rest of the image.

Extraction of the object is a rather difficult task. For example, if the user is wearing a red shirt, and in the background there's a red chair and the user is standing on a red carpet, the human eye can easily distinguish which red parts belong to the shirt and which do not. However, performing such determination automatically with a computer is very difficult task. Moreover, depending on the lighting and the folds of the shirt, different pixels belonging to the shirt will appear as different colors. Therefore, if one goes by simply choosing all red pixels, some dark pixels belonging to the shirt will not be included, while some pixels belonging to the chair and carper will be selected.

The extraction module 203 can determine the location of the object (i.e., all of the pixels that belong to the object) and samples the color (or the average color of the object, which can be more than one color). The module 203 can use this information to create a black and white mask that is first used to generate a 2D or 3D textured shaded and colored mask.

The technique to extract the object is based on 3D color correlation or any other technique such as the closest Euclidian distance between the object average color and the pixel color to separate the pixels of the object from the entire image. The decision as to whether the pixel is in the object or not can be performed in multiple levels and is not limited to the following examples:

1. Color correlation and the first decision can be based on Euclidian distance threshold, where the Euclidean distance threshold is in the RGB color space or chromatic color space. That is, for each pixel, a Euclidian distance is measured from the pixel's color to the object color as determined by taking a single or average color of the object. If the pixel's color is at a distance higher than the threshold, it is determined not to belong to the object.

2. Filter noise by applying morphological operators like dilution and erosion, which can improve the decision regarding pixels that are "wrongly labeled" as part or are not part of the object. In most implementations, the shape of the object would be known or may be estimated. For example, if the user selects pants, the system would have an estimation of the shape of pants. Thus, the results of the selection in (1) above can be further adjusted by checking whether each excluded pixel is within the estimated shape and should be included in the object and, conversely, whether an included pixel is actually outside of the estimated shape of the pants and should be excluded.

3. Decision based on information from previous or forward frames, or from neighboring pixels in a row or around the pixel. This step represents a major decision in the process. In most implementation, it would be unusual for consecutive pixels to be alternatingly selected as belonging and not belonging to the object. Physical object are larger and are covered by more than a single pixel. Therefore, the pixels would be grouped as belonging or not, and a check of neighboring pixels can be used to confirm the selection.

4. Object distance from original election, which can be used as a threshold. For example, for each pixel its Cartesian distance to the original selected pixel is calculated and, if it is outside of the expected distance, the pixel is considered to be outside of the object, and vice versa.

5. Object surface continuation, whereby, if we know that an object surface continues, then we can filter out some of the noise. For example, sometimes the image may have reflections or shadowing that would cause the pixel color to appear drastically different from the true color and therefore, to be indicated as not belonging to the object. However, an object is generally a continuous surface. Thus, the continuity can be used to eliminate such mislabeling.

6. Object edges, whereby we can improve the decision around edges by edge detection that can be done by high pass (HP) filters or other techniques.

7. Decision based on color energy. One of the problems of color separation is that color under low light conditions can be seen as black, and the dynamic range of the decision is reduced significantly. Dark/black pixels can be isolated and other techniques can be applied to decide if the dark/black pixels belong to the object or not, e.g., the present invention can determine if the pixel is located inside the object boundary, or the distance of the energy from the object standard deviation (STD) color changes.

8. Use previous information on the expected object shape to obtain better results.

9. In case the object is a combination of multiple colors or shapes or has logos or other pictures, multiple color correlation and combining can be used. Additionally, any of the multilevel methods specified above can be used to obtain a higher level decision regarding the object.

10. The decision can also be based on a majority or a decision pertaining to a neighboring pixel/image as a weighted factor in the decision. In case we are processing the decision on the image as a vector, it can be easier to look at the neighbors in the same row or same column depending on how the image matrix is reshaped into a vector.

11. Estimation of the item material/texture color standard deviation (STD) can also add significant information for object segmentation. In some implementation, a database of different fabrics and their textured is stored to assist in such determination.

12. Any combination of one or more of steps 1-11 above.

The mask can be used for rendering as a simple black and white mask. However, in order to create a convincing feeling of an object, additional information from the object's texture or appearance can be maintained. In order to obtain the additional important information, the mask can be applied on the original frame or video, and the RGB or gray scale texture, shade, or brightness scale on the object can be obtained. This information is much more accurate and convincing for color changes since it saves the original object's wrinkle texture, shading, light reflection, material signature, and the like.

The model mask can be constructed in layers for improved manipulation. Examples of a potential layer structure can be as follows:

1. Black and white mask (to segment out the object). The black and white mask can be very important to distinguish between the object and the background or between the object and another element around the object. Multiple techniques can be used to optimize the object mask/boundaries decision.

2. Object edge mask—representing the edge or outline of the object.

3. Red color mask—representing red areas of the object.

4. Green color mask—representing green areas of the object.

5. Blue color mask—representing blue areas of the object.

6. Textures that apply to all color masks—representing texture appearance of the object.

7. Shade or brightness mask—representing shaded or bright areas of the object. This may be an intensity map of all of the pixels belonging to the object.

8. Material light reflection mask—representing light reflection of the object.

9. Material light absorption mask—representing light absorbing areas of the object.

10. Mask from other sensors like IR, microwave, depth, ultrasound, ultra band and the like.

11. Layers similar to those described above.

Once the mask model has the required information, in order to change color or texture, the rendering module 204 can be used to modify the specific layer/layers and regenerate the object out of the multiple layers resulting in a rendered video 205 that is extremely realistic. For example, if the user wore a red shirt, the red mask can be replaced with a blue mask to render the user wearing a blue shirt. Since all other masks remain the same, the blue shirt will be rendered with all of the shading, brightness, reflection, texture, etc., of the red shirt, thus rendering a very realistic blue shirt having the same folds and following the same body contours as the red shirt. The effect of some layers can be introduced by multiplication or by adding the modified layer to the frame. Subtraction and division can also define relationships between layers. Additional techniques that allow for more complex item manipulation include a registration technique, which can be based on a few points stretch/transform an object or material to fit within the boundaries of the manipulated object.

The module can obtain the original video/image, the modeled mask multichannel and the required change. The required change can be any combination of color, brightness, material, texture, icon/logo, printing, fabric and the like.

In one embodiment, the required change can be outside or inside the original object boundaries and a modified mask for the new object boundaries can be created to replace the original mask model.

In one embodiment, the required change is fabric with specific oriented texture and color that can be inserted in a specific orientation. In this embodiment, the material orientation can be modified and applied accordingly. For example, a database can store masks corresponding to different fabrics, such that a user can change the fabric of an item the user is wearing by simply selecting a different fabric on the user interface. The system would then replace the mask corresponding to the actual item the user is wearing, with a fabric mask corresponding to the selected fabric.

In one embodiment, the required change can be another user's try-on mask. Using a registration technique, the other user's try-on mask can be applied to fit the new object on the user's similar object to try-on. For example, a user is measured for a shirt and another user is measured for a jacket. In order to show the first user how the jacket from the second user looks, the method can use a registration technique that fits the second user's jacket so as to obtain and apply the correct body line shape of the first user, which can create a more convincing fitting. One benefit of this method is that the jacket will look much more real in that it is rendered so as to preserve all the texture of the second user. To produce these results, the method can register the orientation, location and size of the first user. Registration point may include, for example, midpoint between the eyes, the edges of the shoulders, the edges of the waist, the knees, etc. By stretching or contracting registration point from one user to another user, the garment from one user can be shown as if worn by another user.

In one embodiment, the mask can be used as pointers for virtual object registration. In one embodiment, the mask plus the background recording in the right transformation as the user can be used to eliminate the user/item from the image/video.

In one embodiment, election of the single object or multiple (1:n) objects can be obtained that need to be modeled. From the video, a mask is created per frame. If the user is spinning, a 3D or partially 3D frame by frame model can be created. From this frame by frame model, different perspectives can be obtained and used to create a 3D model that includes some or all of the user's movements. Later on, this information can be used to create a more convincing virtual dressing. That is, the present method can utilize the user's own movements in forming the model.

In one embodiment, the rendering can be performed in the GPU, CPU, cloud GPU or cloud CPU. The input elements to be rendered can come from the CPU, from the user database in the cloud, or from an active link with the inventory/any other database/3D printing, ecommerce data base, social data base and the like.

Changes in item color can be based on actual try-on and available inventory or optional 3D printing on site or in the factory for user customization. One advantage relative to regular virtual dressing is that the item is shown draped on the body just as it would in reality, since all of the folds, shading, etc., will be transferred with the appropriate masks. This is a very important feature from many aspects. The user can sense how the item feels on his body, how it may effect and change his body shape and the like.

In one embodiment, an accessory or any other item can be added by learning the dynamic movement and the mask model of the relevant object. Also, the background can be augmented so as to change or create a different environment by the same technique. Once all the required objects are labeled, the required objects can be masked and the combined mask can be used to change the background.

In one embodiment, the rendering module can render the object with an enhanced rendering technique of interpolating the object and the frame into higher resolution, can combine the object at high resolution, can smooth the edges, and can decimate the object back to the required resolution with better quality of integration into the frame. Additional techniques include working directly on the edge of the object by averaging with some weighting factor the value of the pixel in order to better blend the object with the background color.

Figure 3:
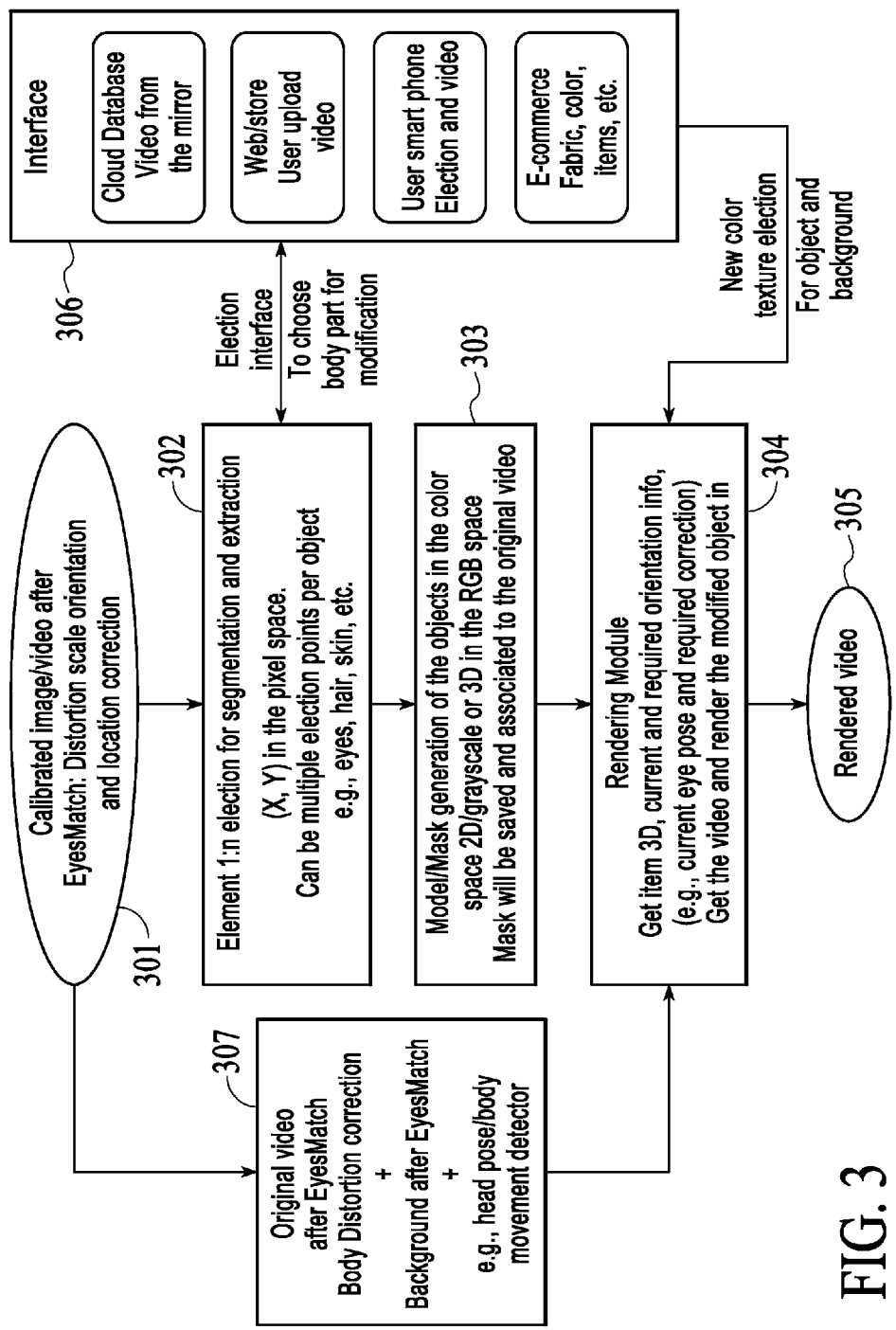
FIG. 3 illustrates an embodiment of an augmented reality module that can replace a body part, color, orientation and texture of an item or object in the foreground or background of the image.

FIG. 3 depicts an augmented reality module that can replace a body part, color, orientation and texture of an item or object in the foreground or background of the image, e.g., the module can add hair to the user, change the user's eyes, skin and hair color, can change the pose of the eyes and the like.

Modules 301, 302, 303 and 306 can work in a similar manner as compared to modules 201, 202, 203 and 206 of the previously described general augmented reality module. Module 304 can have the capability of calculating or obtaining additional information like head pose or body direction of movement directly from the EyesMatch module or from module 307 utilizing a dedicated detector for item 3D movement and orientation and can use this information to modify the required body part, e.g., obtaining the head pose will allow for eyes steering correction by modifying the eyes of the mask/model to the required direction. In addition, the head detection can allow for adding hair in the right orientation, a hat and the like.

In one embodiment where the required mask in some dimensions is smaller than the original mask, module 307 can perform or deliver in real-time or offline EyesMatch transformation of the recorded background image or video. The background transformed image or video can be capable of rendering a part of the body part or item using foreground or background manipulation, e.g., in case one would like to eliminate a user's head or upper body from the video. The transformed background image or video can be applied on the mask that captures the head and upper body, and the result can be rendered with the original transformed or non-transformed video. The result can be a rendered video 305 without the user head and upper body.

For example, in a more complex case, one might wish to depict a shorter length of a given dress. The mask manipulation in module 304 can be required to create a shorter mask for the new dress, and the difference between the original mask and the mask after manipulation can be a new mask for manipulation. In the new mask, some part will be the estimation of the user's legs and some part will represent background that would be newly visible with the shorter dress length. The new mask can be divided to legs and background, and the new rendered object can take the combination of background image and predicted legs to create a new rendered item. The result after rendering the modified item into the video is a user with shorter dress. Multiple techniques can be used to predict how the legs should look in the useable area.

Colograma

In order to manipulate color or appearance of an element in the frame, the pixels belonging to that element needs to identified. This is normally done by comparing colors and assuming that pixels of same color belong to the same object. However, such a procedure is not accurate. In the disclosed embodiments, the comparison is done using variables other than color. The method attempts to simulate the human eye, which can distinguish objects even when parts of the objects may be shaded and other parts may be highly illuminated or even reflective. For example, in one embodiment the object is recognized as a known object with predictable boundaries.

When implemented as virtual mirror, the objects may include clothing items, such as shirt, pants, jacket, etc. So, when a user selects a shirt for manipulation, the system utilizes a predictive association to predict the location of the pixels that should be included in the object. For example, all pixels above the head of the user and all pixels below the waist of the user should not be related to the shirt. Thus, the search space is reduced. This predictive algorithm is improved when it is applied to a frame which undergone the calibration procedure of the EyesMatch. To provide a striking example of the combination of these methods, if the user elects to change only the color of the user's shoes, when the frame is calibrated using EyesMatch, the approximate location of the shoes is known, and all pixels above the feet of the user may be ignored when searching for the pixels belonging to the shoes. This drastically limits the search field.

In summary, in order to identify the object for manipulation, in addition to color comparison, the pixels may also be evaluated using the predictive location of the item, the known or approximate geometry of the object, the texture of the object, a standard deviation from the texture, standard deviation from a representative color, etc. Each of these variables can be assigned specific weight in a statistical evaluation of each pixel. Also, each parameter may be assigned a different error or statistical deviation value.

Figure 4:
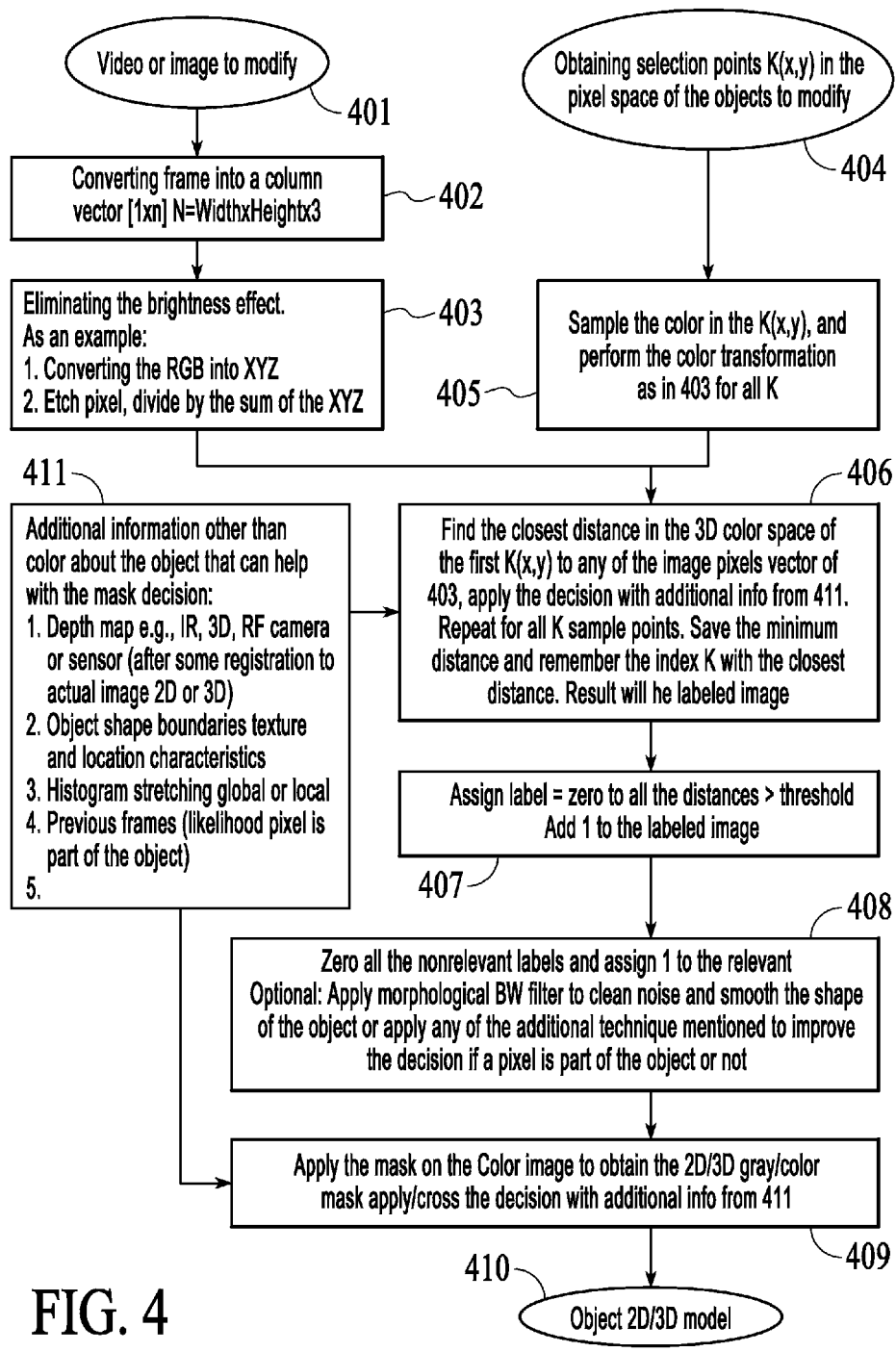
FIG. 4 illustrates an embodiment for computing methods to create a model for color and texture exchange.

FIG. 4 depicts computing methods to create a model for color and texture exchange, which can be referred to as a Colograma. This technique is most beneficial for parallel computing that can support a large number of users or a large number of frames/video as opposed to super high quality color exchange techniques that can be found in software programs such as Photoshop. Such methods can take a lot of time and may not be practical to conduct on any large number of user images or video. The description of FIG. 4 is just an example and any derivative of the depicted flow is part of the present invention.

One challenge to change a color of an object in a video or image is to accurately identify the relevant pixels of the object. In a video file, speed is a limiting factor for applicable transformation. In FIG. 4, a simplified example of a method to segment/extract an object from a video is depicted. The method of FIG. 4 may be executed by the systems described with respect to FIGS. 2 and 3.

The image or video to be modified is received in 401. In 402, the frame of the color image or video is converted into a line vector, which is optional, although vectorization of the image can speed the process time dramatically. The size of the vector is 1 by n, wherein n is the total number of pixels in the frame, i.e., the total number of pixels in the width times the total number of pixels in the height of the frame, time 3 for each of RGB colors. Also, in 403, the effect of the brightness is eliminated. There are many techniques to eliminate the effect of the brightness. In this example, energy averaging per pixel in the XYZ chromatic space is used, by dividing each pixel by the sum of XYZ. The CIE XYZ color space encompasses all color sensations that an average person can experience. Y is defined as the luminance, and for any given Y value, the XZ plane will contain all possible chromaticities at that luminance. For example, a 3×3 matrix can be used to convert RGB to XYZ, using the chromaticity coordinates of an RGB system $(x_r, y_r)$, $(x_g, y_g)$ and $(x_b, y_b)$ and its reference white $(X_W, Y_W, Z_W)$.

In parallel, at 404 the object selection is performed by first determining a comparison color that can be used for examining all pixels for determination of whether each pixel does or does not belong to the object. The comparison color is determined by using statistical analysis of the color of several K pixels that are believed to be within the object. This may be done by first selecting several points K(x,y) believed to belonging to the object to be transformed, by, e.g., knowing the geometry or the approximate location of the object within the image. K is the number of locations/zones with distinguished color that can be segmented out of the background or out of other objects. In some implementation, for each location, a window, or zone, is selected around the specific point, so as to ensure that the point or pixel is not an anomaly, but rather representative of the particular zone. Then at 405 each point K(x,y) is passed through the same transformation as performed in module 403. At 406, k iterations are performed to find each pixel's color and from that to find the best representative color of the object. This color can be used for the follow up investigation to find all of the pixels that belong to the object. K equals to or is larger than 2 in this technique. For each k, the Euclidian distance 2D or 3D is calculated. The minimum distance and K value is saved and is used as the comparison or representative color. This operation can be done on all pixels at once in a relatively fast process.

$$\text{dist}=\text{sqrt}((X-xi(k))^2+(Y-yi(k))^2+(Z-zi(k))^2)$$

After K iterations, the labeled image can be obtained. The Euclidian distance "dist" is just an example of a computational method to distinguish between colors; there are other methods to calculate the distance between colors, e.g., a color distance model based on human perception of color (chromatic, saturation and brightness), advanced calibrated techniques to match the sensitivity and the ability to separate color with the human eye like in CIE76, CIE94, CIEDE2000 and the like or any combination with histogram stretching IR/3D depth camera, color integration over time or any other method to improve sensitivity of the color detection (module 411). Applying or crossing the additional information from module 411 can happen at the distance comparison level 406, at the very end of the model creation 409, or any combination depending on the nature of the additional information (deterministic, statistic, time variant, and the like).

For example, when an IR camera is used, the image of the IR camera can be registered with the image of the standard camera. Then, the image of the IR camera can be used to easily separate the user from the background. This information can be used to limit the pixels of the standard camera that are to be evaluated whether they belong to the object or not. For example, when the comparison is done using a vector, the information from the IR camera can be used to reduce the number of entries in the vector that should be evaluated. Similarly, a texture mask can be used to remove pixels from the evaluation vector. For example, the texture of the carpet can be stored and any section of the image having the same texture can be eliminated from the evaluation since it is known that the user would not be wearing a carpet. Thus, several layers or masks may be used to operate on the vector and increase the accuracy of the results of isolating the object and assigning all of the pixels that belong to the object.

In addition to color difference we can also use other techniques that can add information about the object to improve the decision such as: zone likelihood (a given pixel needs to have neighbors or some mass of pixels), zone characteristic, boundary filters to isolate the object boundary before making a final decision, depth information (which typically needs to match the contour of the depth information with the end image of the object in 2D or 3D), time integration to determine if pixel is in the object zone over multiple frames, and the like.

Module 407 is an example of one embodiment of how to distinguish between the required colors and the other color space. In module 407, all the pixels with a distance greater than a threshold are zeroed out as non relevant (a pixel with a color different from any one of the colors 1 to k), and 1 is assigned to all relevant pixels, thereby generating a binary mask which identifies all of the pixels belonging to the object.

Module 407 is an example where it is desired to separate a specific color or colors. Here, all the indexes can be zeroed out except the required one. The process proceeds as follows: zero out all the non-relevant indexes, obtain a background and non-relevant colors value=0, and elect the required color object labeled=1. If there is more than one color in the object, 1 can be assigned to any elected index 2 to k+1 and zero to all the others.

In 408 a black and white filter can be used to clean noise and smooth out the shape of the object. Other techniques may be used to improve the decision of which pixels belong to the object. As a result, an index for all the relevant colors starts at 2 to K+1.

At module 409, the obtained black and white mask is applied on the original color image and the 3D model for color and texture changes is obtained. The model can be 2D alpha channel of gray scale or 3D in the color space. Module 410 can obtain a 2D or 3D model of the object. In case of video from a single camera, it is possible to obtain a 3D model even if the user is moving in front of the camera, e.g., turning around in front of the camera. In this case, it is also possible to obtain object measurement in multiple cuts to estimate the user's 3D body curves.

Figure 9:
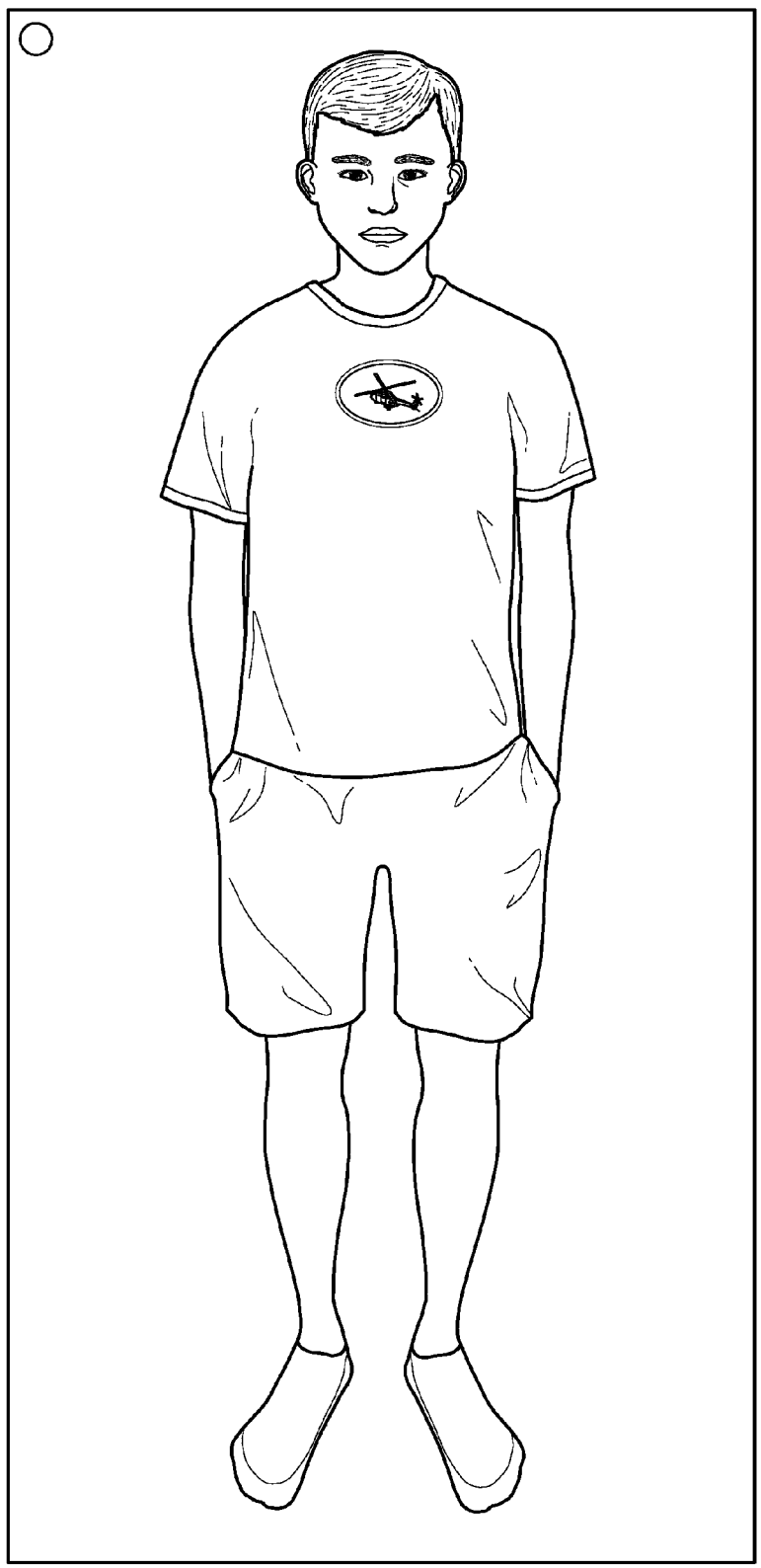
FIG. 9 illustrates an example for a 2D input to the model generator.
Figure 10:
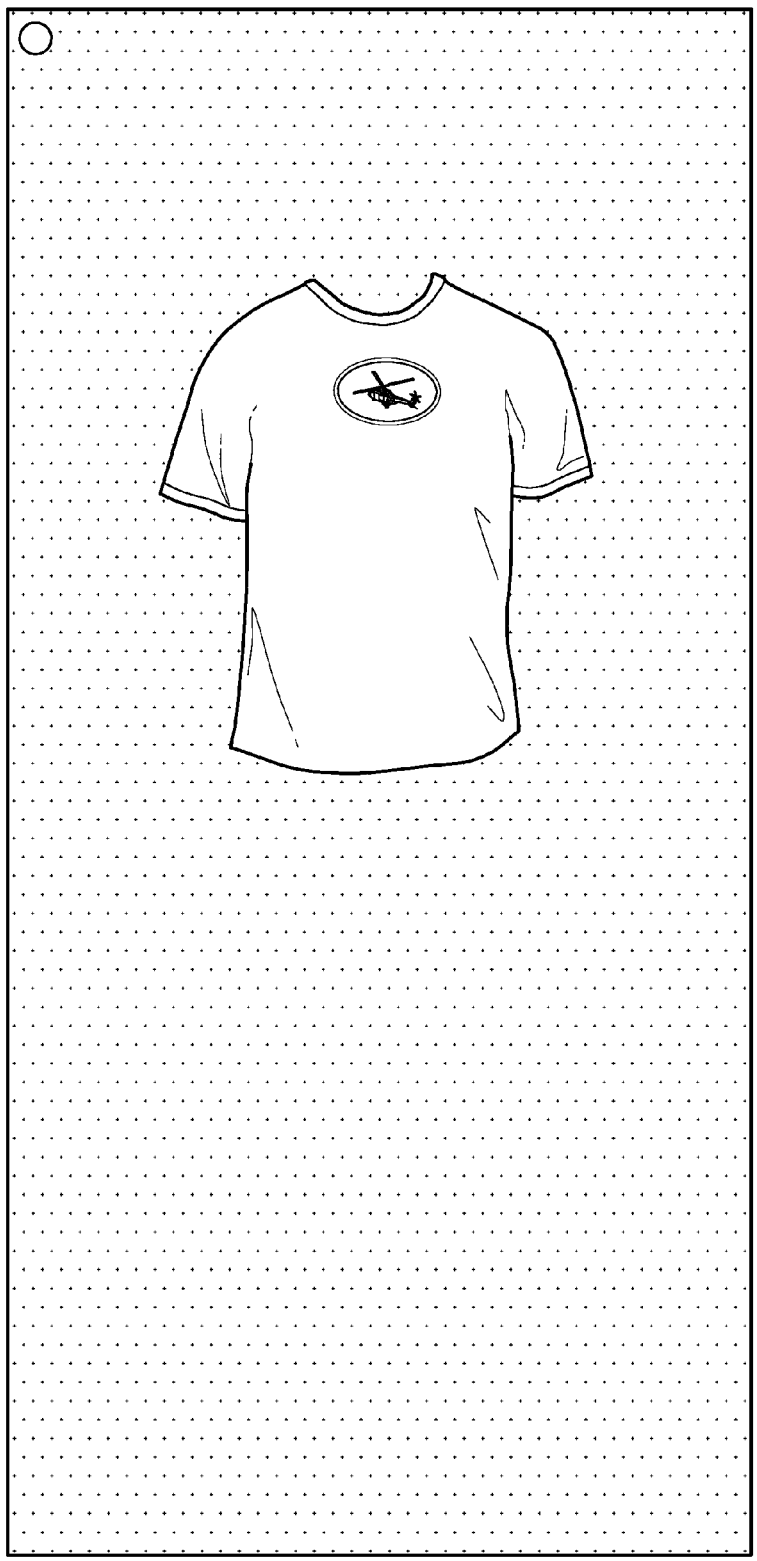
FIG. 10 is an example of a 2D model of the upper shirt from the image of FIG. 9.

An example of a 2D input to the model generator is provided below, where it is desired to create a model of the user's blue shirt shown in FIG. 9. FIG. 10 is an example of a 2D model or mask of the shirt, without the color information. Instead, a grey scale mask of the selected object, in this case the shirt, is generated and can be used later with any applied color. The texture of the shirt is preserved in this manner, so it is relatively easy to manipulate the color or the texture or even change the boundary of the model to create a different object.

The model based on just color difference is not perfect in terms of quality hence additional information and techniques can be used to improve the quality of the object model (see, module 411). Additional information techniques like interpolation and decimation or edge smoothing can be apply after processing via module 410 in order to improve the quality of the model.

Body Measurements

Figure 5:
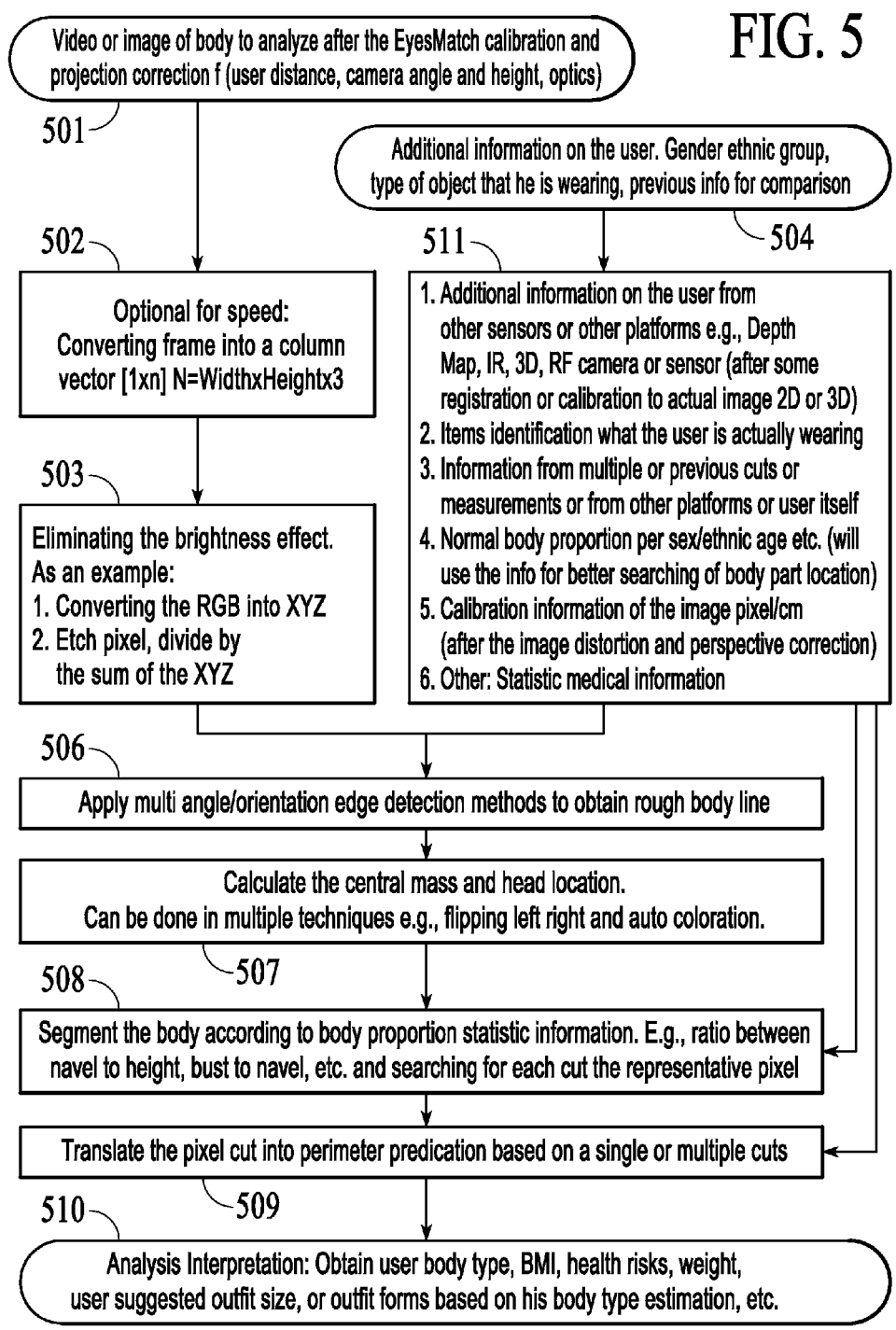
FIG. 5 illustrates an example of a method to extract a body measurement from an image, multiple images or a short video.

FIG. 5 depicts an example of a method to extract a body measurement from an image, multiple images or a short video. The body measurements can be used for various applications and services, such as, e.g., estimation of weight, determine best fitting clothes, monitor body shape and weight over time, etc. Since the system acquires many images of the user at different stances and orientations, it may be beneficial to select the best image for performing the body measurements. The determination of which image to select may be performed before or as a part of the process illustrated in FIG. 5. Specifically, a good body measurement can be obtained when the image is of user's body in perpendicular alignment to the optical axis of the camera. This may be determined by first determining whether the face appear symmetrical along a vertical line passing midway between the eyes. If the face appears symmetrical along this line, a vertical line along the center of the body can be used to confirm that the body is symmetrical along that line. For this step, it may be beneficial to first remove the hands from the image, such that only the center of the body is considered from the symmetrical determination. The process of removing the hands from the image is described more fully below.

In module 501, the image is analyzed using a body line and Body Mass Indicator (BMI) analysis by first using a process similar to the EyesMatch approach described in U.S. application Ser. No. 13/843,001. In this approach, the image can be rearranged and transformed to compensate for distortion due to the setup geometry of the camera and optic distortion. Example of setup distortion factors include the user distance to the camera, the camera height, camera projection angle, the optics of the camera's FOV and other optic distortions. After the image correction, each pixel area representation can be roughly uniform in area ($cm^2$). Processing can be done in CPU, GPU, DSP in the camera, local computer near the camera, or remote server.

Module 502 is an optional element, which can transform a 2D image to a vector conversion to speed up processing. The size of the vector is the image's width, times the height, time three pixels (for RGB). The image inputted into module 501 can also be a vector already. It can be easier to perform some types of image processing on 2D matrix while other types of image processing are better suited for the vector image.

In module 503, it can be easier to perform the color manipulation to eliminate light and saturation effect on the vector image. This is done in a similar manner to what is described with respect to 403 above.

In module 506, the image can be made to pass an edge detection filter that can emphasize color changes and enhance the visibility of the body line. The edge detection can support edges of the body line so it can support multiple edge directions. For example, an edge filter with vertical, horizontal and +/−45° capabilities can yield a good edge detection of the body line.

Modules 504 and 505 can provide additional information into the algorithm that can help with the image analysis, e.g., sex, age, race and the like of the user and statistical proportions associated with the information. This information can be used later on to focus the search of body parts. The height measurement can be used with complementary body proportion information to focus the search of specific body parts, for example, the bust, navel, waist, hips and the like.

Module 507 can provide head detection. There are multiple techniques for head detection. For example, one can take the edge emphasized image, flip it along the body length, and perform correlation between the images. The peak of the correlation can indicate the central mass of the body. Another alternative method is centroid center mass calculation of only the edges. Centroid center mass calculation can be less accurate if the light on the user is not uniform enough; however, this technique can be faster. Other techniques can be based on pattern recognition, eye, nose, and shape detection of the head. Once the central mass is found, a relevant window can be cropped to identify the body from the image. Also, the emphasized edge of the tip of head can yield the height of the user in pixels. Since the image has a uniform weight of length per pixel, the total height can be calculated accordingly. The assumption is that the module 501 transformation will yield consistent manipulated images across arrangements, e.g., 1-5 meters (m), where the actual height of the user on the screen in pixels will be proportional to the actual user height. Additional factors can be added if this assumption is not exactly the case per all distances.

Figure 13:
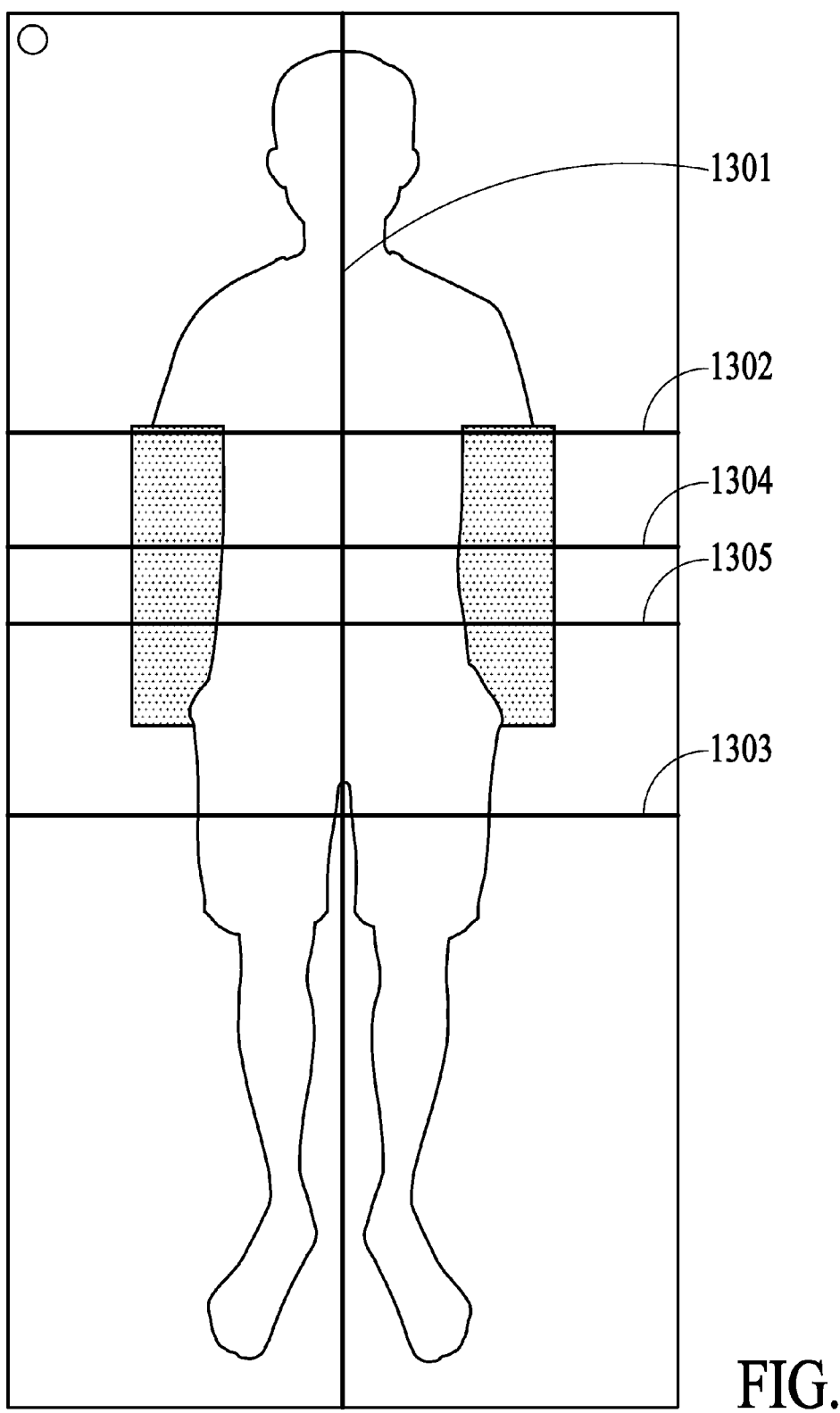
FIG. 13 depicts an example of the result of additional processes that eliminate the hand from the body and point to different intervals of where to look for particular body measurements.

Module 508 can measure the size of body parts in pixels. The technique can be an additional process on a focus area to further emphasize the body part. FIG. 13 depicts an example of the result of additional processes that eliminate the arms and hand from the body and point to different intervals of where to look for particular body measurements. The intervals can be calculated by generating a vertical centerline, 1301, which may pass through the center of gravity or the axis of vertical symmetry of the user's image. Then horizontal section lines can be added to generate areas fit for body measurements. For example, line 1303 delineates the location where the legs connect to the torso, while lines 1304 and 1305 delineate the narrowest area of the waist.

Measurements in pixels can be translated into centimeters (cm) according to the predicted curve, e.g., the neck can be modeled as a cylinder so the measured width of the neck in pixels can represent the 2×radials in pixels, then the radials in pixels can be converted into cm per the calibration. The bust for a man has a more elliptical model, so the translation will be a bit different. If additional side measurements are available, such measurements can be added to provide more accurate information to the model.

Figure 11:
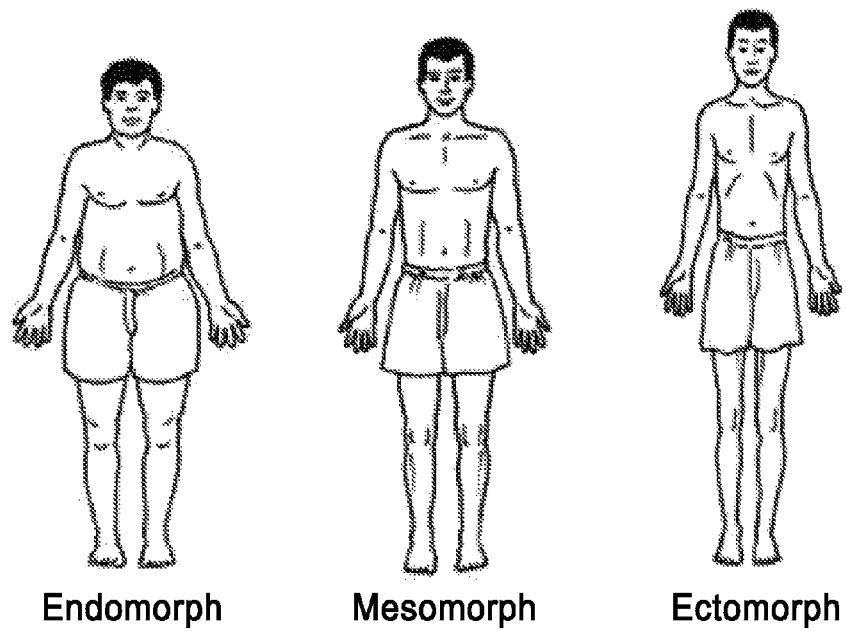
FIG. 11 is a schematic illustrating classification of male body types.
Figure 12:
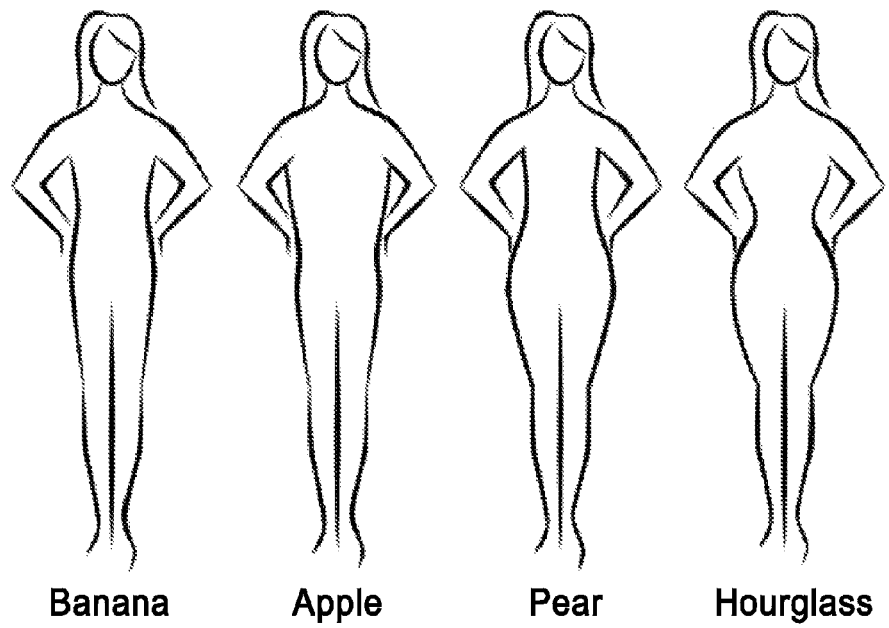
FIG. 12 is a schematic illustrating classification of female body types.

In module 510, the measurement can be deduced from the body type of the user, e.g., a "pear" shape if the hips are wider than the bust and waist (see, FIGS. 11 and 12). In addition, some analysis can suggest the following:
1. body condition health risk for heart issue and the like;
2. the type of clothing that best fits the user's body type;
3. trends in the user's body for historical comparison;
4. focused advertising based on the user's body type (e.g., Mesomorph/Endomorph can get focused coupons for the best nutrition that fits their body type);
5. body recognition; and
6. body diagnosis can monitor body changes over time (spin condition, flexibility, potential tumors, and the like).

Information on the user's BMI can be learned or estimated from the object model described in FIG. 4 or directly from the image BMI analysis as described in FIG. 5.

In various applications it is beneficial to "learn" the texture of specific articles in the image. According to various embodiments, to measure texture with a good resolution, the object is first isolated from the image. In one embodiment, after segmenting out an element or body part, additional fine texture reconstruction or measurement can be implemented. Texture measurement can be done with 2D, or 3D sensor (camera).

In embodiments utilizing a 2D sensor, the following two examples can be implemented. Since the user will be moving in front of the mirror, the system can capture two images (e.g., consecutive images) that will be used to calculate depth or texture. There are multiple ways to do so and, as an example, the system can extract two or more images from the video and based on central mass detection can calculate the distance and use the distance for the stereoscopic calculation of the texture. That is, when taking a stereoscopic image using two cameras, the distance between the cameras is known, so that triangulation can be performed using the distance between the two cameras and their angle of optical axis. But if there's only one camera, then the system takes two images using the same camera, but separate in time. Consequently, the user would have moved a bit between the two images. The system then calculates the difference between the two pictures and performed reverse triangulation. This can be done by calculating, for example, central mass of each pictures and then calculate the x-y distance between the two central masses (for example, in pixels). This can be used to perform reverse triangulation as if the two images were taken using two cameras. Other pointers can be used to calculate the distance, e.g., the processor can identify the eyes in the two pictures and calculate the distance between the eyes in the two pictures. Another option is to determine rotation of the user, i.e., (r,θ) and use that to perform the reverse triangulation. In any of these methods, since the camera can be positioned at a height that is above the central mass of the user, e.g., on top of the monitor, the reverse triangulation can be used to calculate depth, thereby acting as a depth sensor.

Alternatively, the system can find noticeable pointers in both images and try to match them, then eliminate all the pointers without clear identification. This can be done using, e.g., RANSAM Random Sample Matching technique to find from a random set of pointers the group that has similar behavior and use those pointers to find the distance in pixels for texture measurement or 3D construction of an element.

Another option is to estimate the distance between the mirror based on the distance and the body rotation. For example, if the system can measure the user's body pose, it can estimate the texture.

With 3D sensor, the system can do the same as in 2D, although in order to improve the dynamic range and the accuracy the system needs to isolate the element to be measured. The background subtraction can be improved by rough depth measurement threshold. The system can estimate the texture every 1 or more frames and just smooth the texture changes between frames by Kalman filter or any other interpolation extrapolation techniques.

In some embodiments, only a 3D sensor will generate depth measurement that will be used to control a parametric model of the user's avatar. The user can be virtually dressed and explored in 360°. In addition the system can be controlled to adapt position movement to the user for mirror application or video conferencing. To match the avatar to the user movement, a registration technique can be used where the registration pointers can be allocated in multiple ways, e.g., automatic noticeable element detection and RANSAM random sampling and matching technique. Once the system has the pointers, it is easier to move the avatar based on the actual user movements. The data from a depth sensor or 3D camera can pass a similar mapping transformation engine and the result can be the base of a more accurate 3D avatar of the user. The avatar can be used fully or partially as a model base to present virtual elements on the user.

Other technique to fit the registration mapping is to identify element in the image like head, hands, upper body legs and match the movement of the avatar to these elements motion. The motion can be measured and estimated every 1 or more frames and the smooth coarse of the avatar movement can be done by Kalman filter technique. The avatar motion can be done in real-time, semi real-time, or offline.

In some embodiments, the system receives the stream of images (either from one camera, from two cameras, or from a 3D camera), and use the stream of images to generate virtual reality in real time. The original images from the camera are discarded, and instead the virtual world is presented on the monitor. Since the real time images are used to generate the virtual reality, the virtual reality images faithfully represent the real world as imaged by the cameras. Thus, as noted above, the real time images can be used to generate an avatar in real time, where the avatar faithfully represents the user captured in the images. On the other hand, the background and articles worn by the user can be changed, such that the user's avatar can be displayed as if it is in a different location wearing the same or different articles as the user. For example, if the user tries on a ski coat, the real time images can be used to generate an avatar that corresponds to the user and which wears the same coat, however the background can be changed to display a ski slope, so that the user can imaging himself wearing the coat on a ski slope.

On the other hand, it is also possible the store the real time images, and then operate on the images off line, such that higher processing capacity is available, so as to generate a movie using avatar based on the user. The movie can then be sent to the user, e.g., over the Internet.

Security and Other Applications

Figure 6:
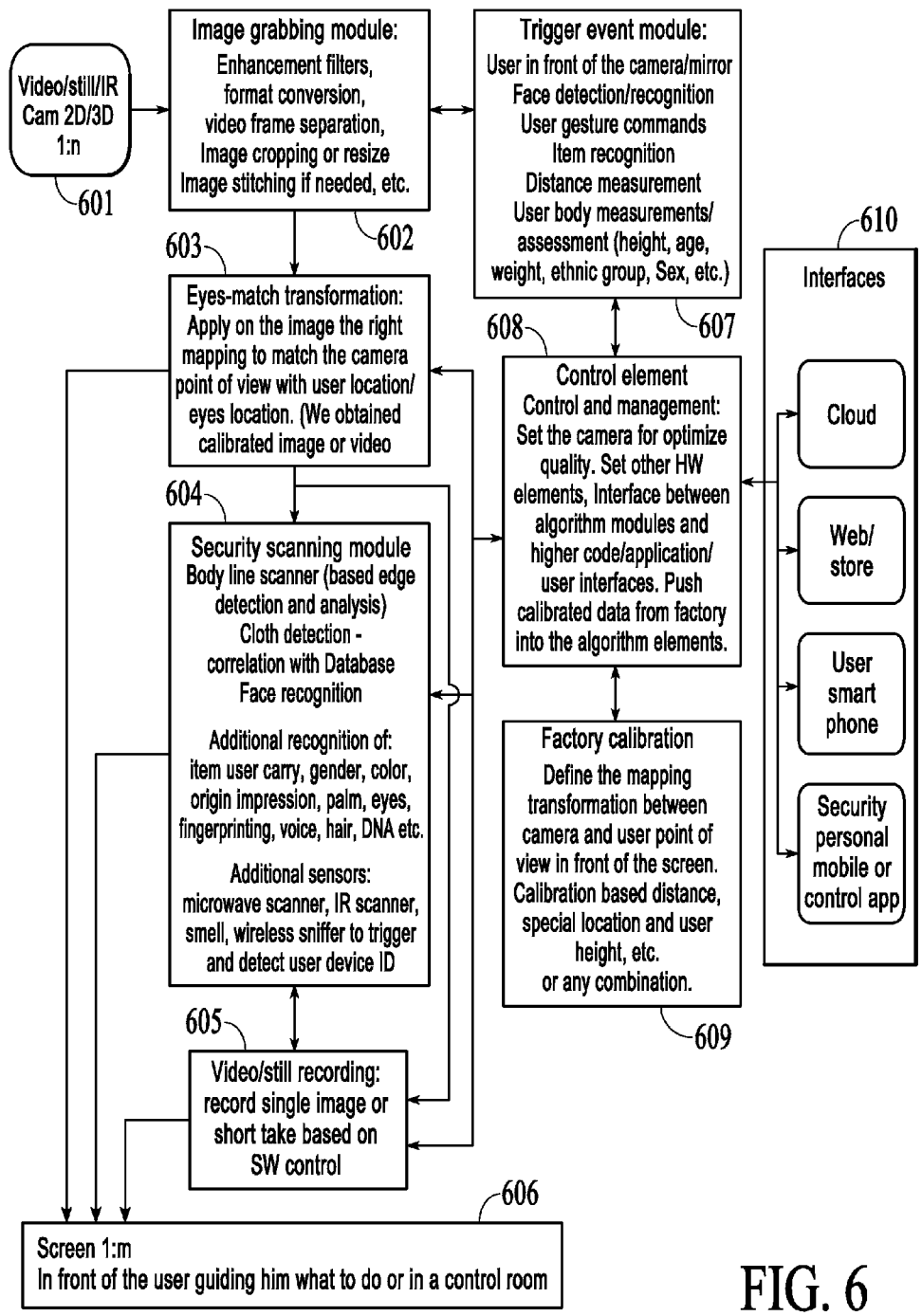
FIG. 6 illustrates an example of a security system application for multilevel user learning and authentication.

FIG. 6 is an example of a security system application for multilevel user learning and authentication. This is just one example of possible flow implementation; any combination of the flow or different functional separation between the diagram modules is part of the invention.

As in the previous figures, stills or video from device 601 can be input into an image grabbing module 602. The image grabbing module 602 can be controlled by a trigger event such as those previously described and processed by trigger event module 607, which can provide tracking information and rules to initiate an image grabbing process. Specifically, the image grabbing module 602 can grab the image from the input 601 and push it into the EyesMatch transformation module 603 with the additional tracking information (real time geometric measurement). Based on the tracking information and the event requirement, the EyesMatch transformation module 603 can calculate a transformation to manipulate with the camera point of view, angle of view, and the like to create a calibrated image of the scene. In addition, the EyesMatch transformation can be performed locally in GPU/CPU/DSP, in the cloud and the like. In one embodiment, advanced information on the user or on the geometric structure of the scene can feed the tracking algorithm and may take part in the calibration. The additional information can be provided as one time geometric information, e.g., user height, distance between his eyes and the like. In that case the additional geometric information can be used to calculate the required transformation. The difference between the distorted image and the known geometric can be used to calculate and calibrate the transformation.

The calibrated output from the EyesMatch transformation module 603 can then be fed into the security scanner module 604, which can also be called a scene analytic module. The security scanner module 604 can be adapted to learn one or more of the following: body line or body curve scanning based on multiple techniques, e.g., edge detection, statistical edge detection, IR camera, microwave sensor, 3D camera, single camera and multiple cuts when a user is turning around. A complete 3D model of the body can also be taken when the user is turning in front of the video camera and the user's clothes can be extracted to an alpha channel as described in the technique depicted in FIG. 4, i.e., Colograma, and the like.

Other learning or authentication methods include, for example, cloth detection, whereby a signature to an item is created and sorted in a database. The database can be updated from the internet, by scanning clothes from multiple databases and ecommerce stores or by actively scanning and updating information by the operator, for example, a uniform of security personnel, the type of fabric and the like can be entered.

Also, the combination of EyesMatch with face recognition can allow the operator to install a camera above a user's height, for example, above a door facing down about 30-45 degrees; such installation allows the user to move freely below the camera. In this scenario, for example, the detectable face recognition range is about 1-5 meters in front of the camera. This is an advantage since known face recognition systems are not very accurate if the user's head is scanned at an angle of +/−15 degrees.

Additional body authentication sensors can include voice, smell, palm, fingerprint, eyes, DNA, skeleton with X-ray sensors or ultrasound, teeth, hair, impression, color, eyes, blood, halo, temperature, skin marks, ears and the like.

The video, stills or the analyzed data can be recorded with a video/still recording module 605 directly from the camera, from the EyesMatch transformation module 604, from the processed image or from data out of the sensors.

The visual video/image or analyzed data can be displayed in front of the user screen (full body or smaller), delivered over the cloud or delivered directly to a control center to be displayed on a screen 606 or to a module for further processing and analysis.

Modules 607, 608, 609 and 610 are similar to modules 107, 108, 109 and 110, respectively (see, FIG. 1 and associated descriptions thereof).

Figure 7:
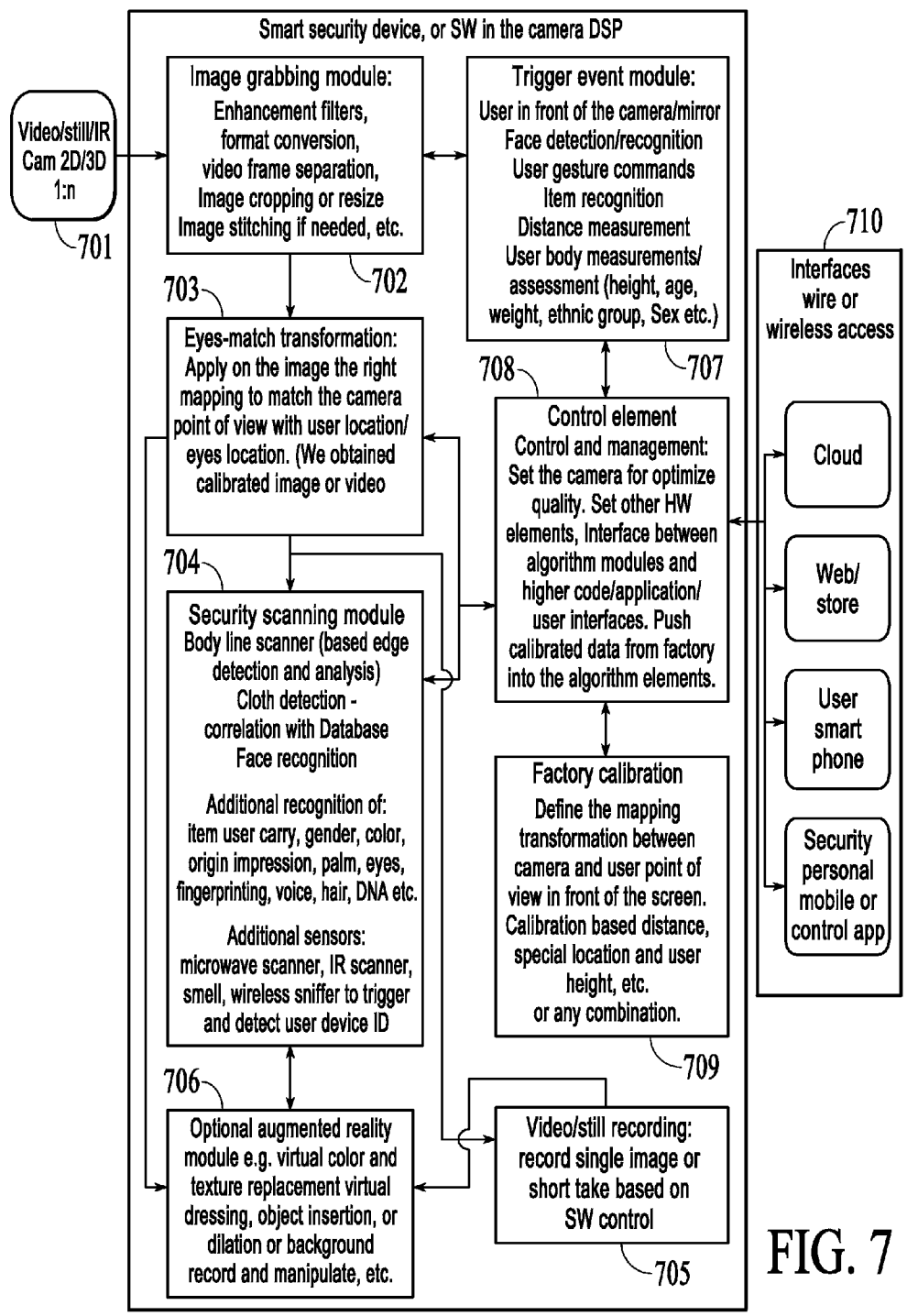
FIG. 7 illustrates an example of a security system application for parallel or in-band camera manipulation.

FIG. 7 depicts an example of a security system application for parallel or in-band camera manipulation.

The capability of the device in FIG. 7 can reside in a stand-alone device as depicted in FIG. 7 or as part of the camera DSP capability; the control of the feature activation can be done wirelessly or via wired infrastructure. In addition, some of the capability can be supported in a remote location, e.g., measurement and tracking. In addition, the device can be deployed in front of the camera and can project a manipulated image on a small screen to the camera.

The camera main stream can feed the device or the device can be adapted for taping and sniffing the camera main stream. After processing, the device can be adapted to send parallel data to the operator.

The device can have multiple image computing capability, EyesMatch geometric capability, e.g., in the EyesMatch transformation module 703, body measurement and user authentication, e.g., in the security scanning module 704, and augmented reality capabilities, e.g., in the augmented reality module 706, where the image can be manipulated on the main stream or in parallel to the main stream, e.g., manipulations can include a change of a user's body type, color, items held by the user, hair style, complete user disappearance and the like. These capabilities are very important for security usage.

In addition, the video stream can feed another device like a robot, a head mounted display, a user application and the like.

The interface to control the device functionality can be over the wire or wireless infrastructure or to a local or remote location. The measurement module can reside in the device or in the cloud.

In one embodiment, the capability, for example, can be done in real-time or offline. The activation of the device can be done, for example, periodically, in response to a trigger event or manually, as needed or desired.

The device can support real-time control and triggers for other devices, e.g., a projector for changing the image the user may see (camouflage), or a trigger event for an accurate threat eliminating device that needs an accurate coordination in front of the camera.

Video can be shared real-time with additional stations. There are multiple ways to share the video. Some exemplary scenarios are discussed in detail below.

Figure 8A:
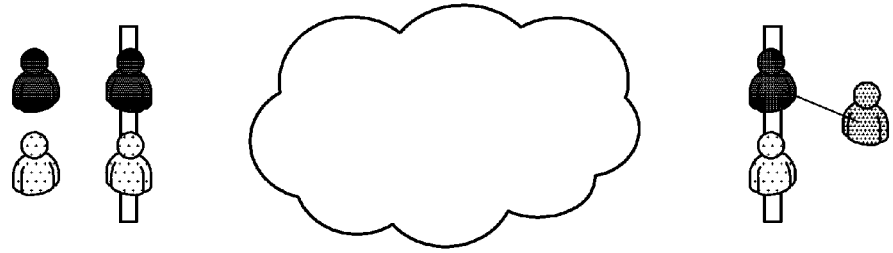
FIGS. 8a-8c illustrates schematics for sharing mirror experience in a video/voice conference.

Sharing the mirror experience with one or more other users remotely, where the user see himself on a local station and the remote user see the user in the mirror and share with him the experience. The remote user can have any suitable device; the main experience is to see the user who is standing in front of the mirror and is doing something for review. The user will be able to see a mirror image of himself based on EyesMatch or any other technology. FIG. 8*a* depicts this scenario. The remote user can just see the user broadcast, text the user, speak to the user and/or be seen in a small window on the mirror screen.

FIG. 8*a* depicts a sharing mirror experience in a video/voice conference. As shown in FIG. 8*a*, the mirror experience can be shared live with user/users in the cloud or via another mirror station. In the first case, the user can see himself in a mirror mode although the video stream that goes to the cloud needs to pass an additional mirror flip back to correct the gaze orientation on the other side. So, when the user (in mirror mode) looks right or left, his eyes/gaze on the other side will move to the right direction as if he looked at the right direction.

Figure 8B:
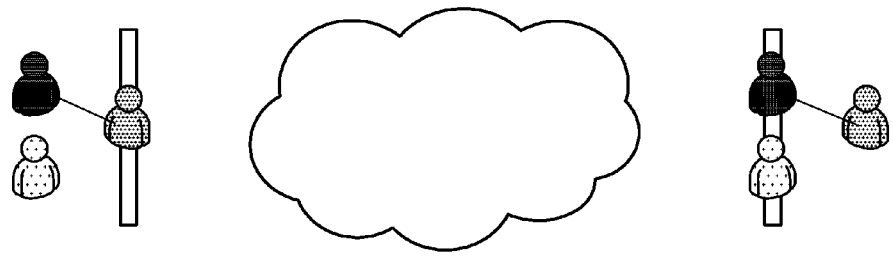

FIG. 8*b* depicts sharing a full body video conference. As opposed to a regular video conference where the camera can be streamed "as is" to the other side, in mirror station, the image that is being sent to the other side needs to be flipped left-right on the remote location. This can be done by flipping the mirror captured locally or on the remote side.

In FIG. 8*b*, when two or more users communicate with each other in the full body stations, the user/users in one station will see the user/users from the other direction in the right orientation as well. As shown in FIG. 8*b*, the user can see himself standing on the left side of the local screen, and the user can see the other user on the right side of the local screen. In this case the local video is already mirrored, an additional flip/mirror will be needed when streaming the video to the remote location/locations (when broadcasting).

Any combination of mirroring, flipping, rotation and the like of the local or streamed video to match this experience of the local mirror and gaze correction on the other remote location are part of the invention.

In one embodiment, both stations are EyesMatched/calibrated to the same geometrics and dimensions; every one of the stations creates a full body mirror and sends it to the remote location/locations. The full-body and EyesMatch experience will occur on the video conference as well, and the user will get the feeling they are looking into each other's eyes.

In one embodiment, where there is more than one user in one location, the EyesMatch or body distortion correction can be done per user with tracking capability per user or for both simultaneously. In order to eliminate the line effect, in this case, augmented reality capability can replace the background as described above. In the augmented reality mode, Colograma or another technique can be used to replace the background with a plain background. The connection line can be placed between the users to eliminate lines or discontinuity with respect to the users themselves.

Figure 8C:
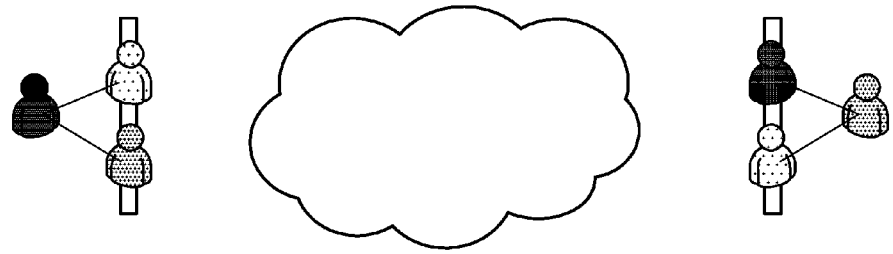
Figure 8C:
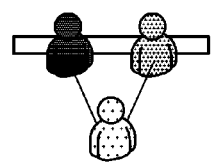

In one embodiment, where there are more than two stations, the screen can be divided to allow multiple users from multiple locations to be displayed at the same time, or multiple screens can be placed one next to the other as depicted, for example, in FIG. 8*c*. Specifically, FIG. 8*c* depicts multiple mirrors/full body stations with split screen or multiple screens. As shown in FIG. 8*c*, the order the users are depicted in the mirror allows for correct gaze communication. When the user is looking to the right, for example, on the remote screen, after the flip, he will be seeing the user looking left toward the remote user.

This is just an example and any number of users near the screen or in remote location should be organize to allow for right gaze approach. In one embodiment, further gaze and eye contact improvement can be applied to improve the experience. In one embodiment, the screen can include 3D capability, and 3D capability per user in the screen.

In one embodiment, in addition to the EyesMatch or any computerized image processing at one side, the remote location can have additional computerized capability to manipulate on the far end video based on the local user tracking, e.g., if the user gets closer to the screen, the far end video or image will be processed to look a bit bigger and projected to provide a better feeling of a live session. Another example is when a user gets closer on one end, he will see a wider FOV of the far end.

User Interface

The present invention includes virtual mirror control and virtual system features to ease the usability of the virtual mirror. The virtual mirror control and virtual system can include various modes of operation including, for example, on, off, restart, mirror, display, idle, and the like. The virtual mirror control and virtual system can include authentication and registration of users, which can be automatic, manual or a combination of automatic and manual. The virtual mirror control and virtual system can include an optimal flow of operation to ease and enhance the user experience.

The virtual mirror control and virtual system can include one or more interfaces to control the mirror, e.g., automatic gesture, voice, eye pointing, mobile application, remote expert, local assistance, and the like. The virtual mirror control and virtual system can include a comprehensive combination of interfaces, including the following: playing a recorded video (automatic/manual); advance effects (item color manipulation, augmented reality features, gaming features, background change, 3D effect, lighting effect and the like); screen mode (orientation/full size or split screen); sharing techniques and methods to share the experience with friends/experts in real-time and on the go; mobile user application for controlling display and sharing, for example, sharing of personal videos and images taken from the virtual mirror or the user mobile device; retail or enterprise remote for general management (provide retailer information about the user in real-time with advanced control and analytics capability); and a module to teach the user how to operate the mirror (animation, video, voice, visual hints and the like).

Figure 14:
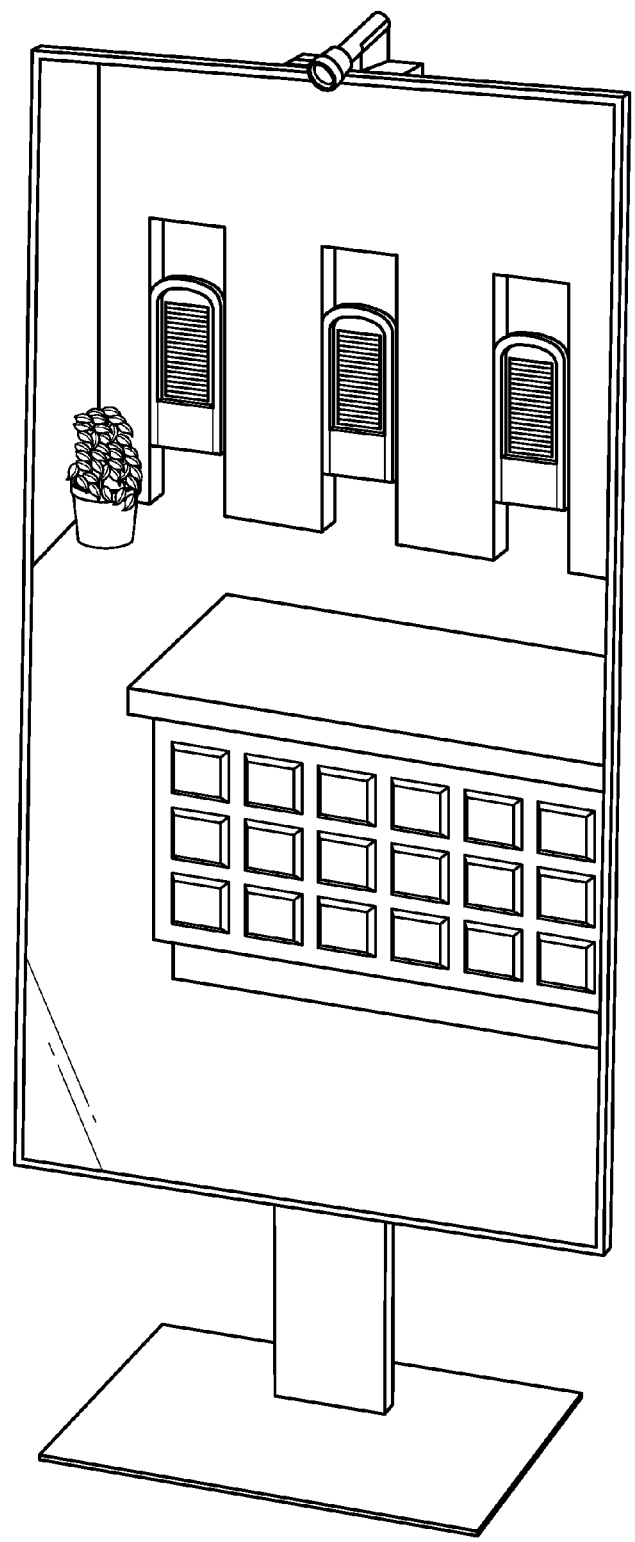
FIG. 14 depicts an example of transformation on a camera stream to create a mirror effect on the background environment.
Figure 15:
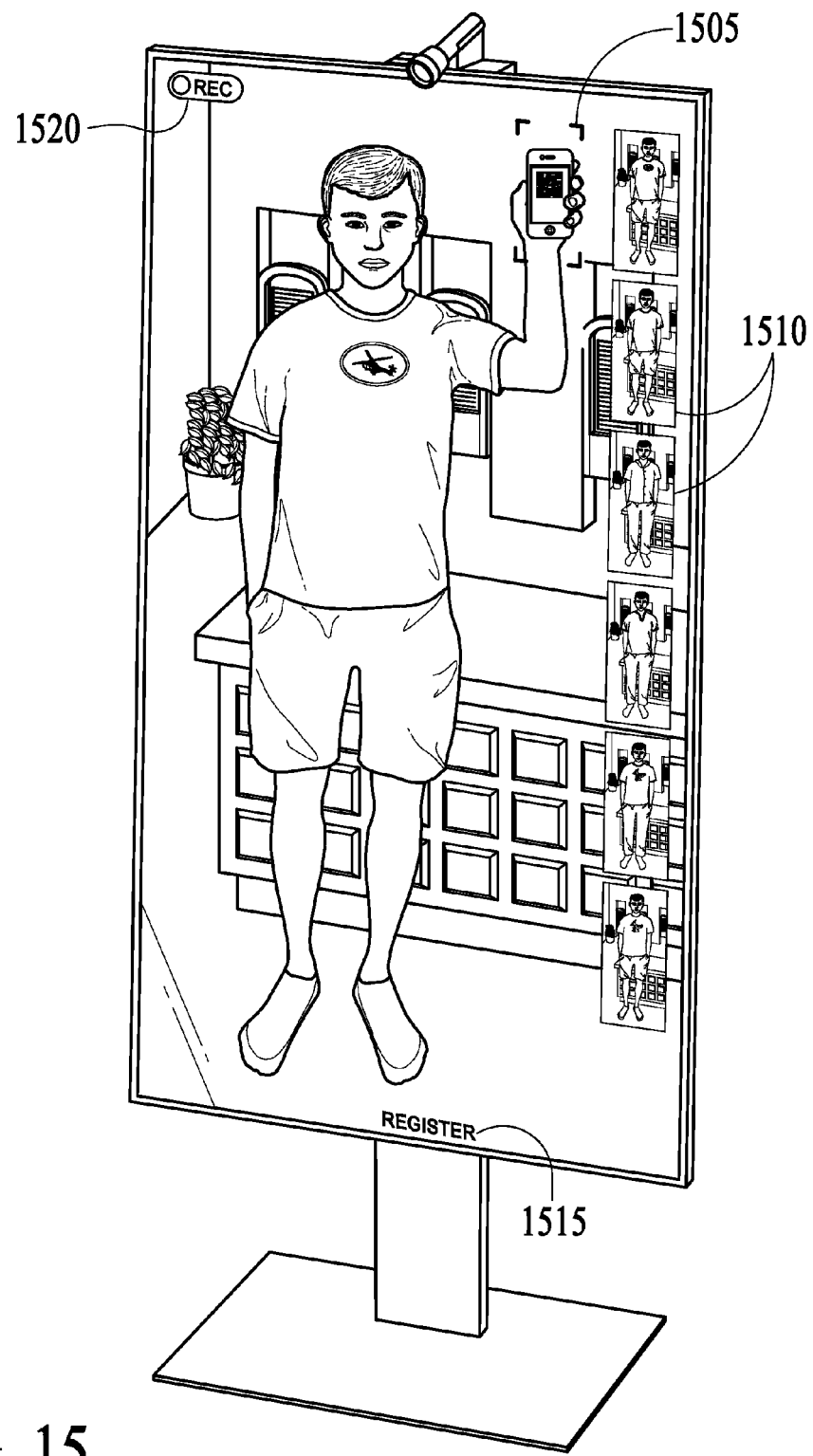
FIG. 15 illustrates an example of a virtual mirror with user recognition and authentication and with user interface.
Figure 16:
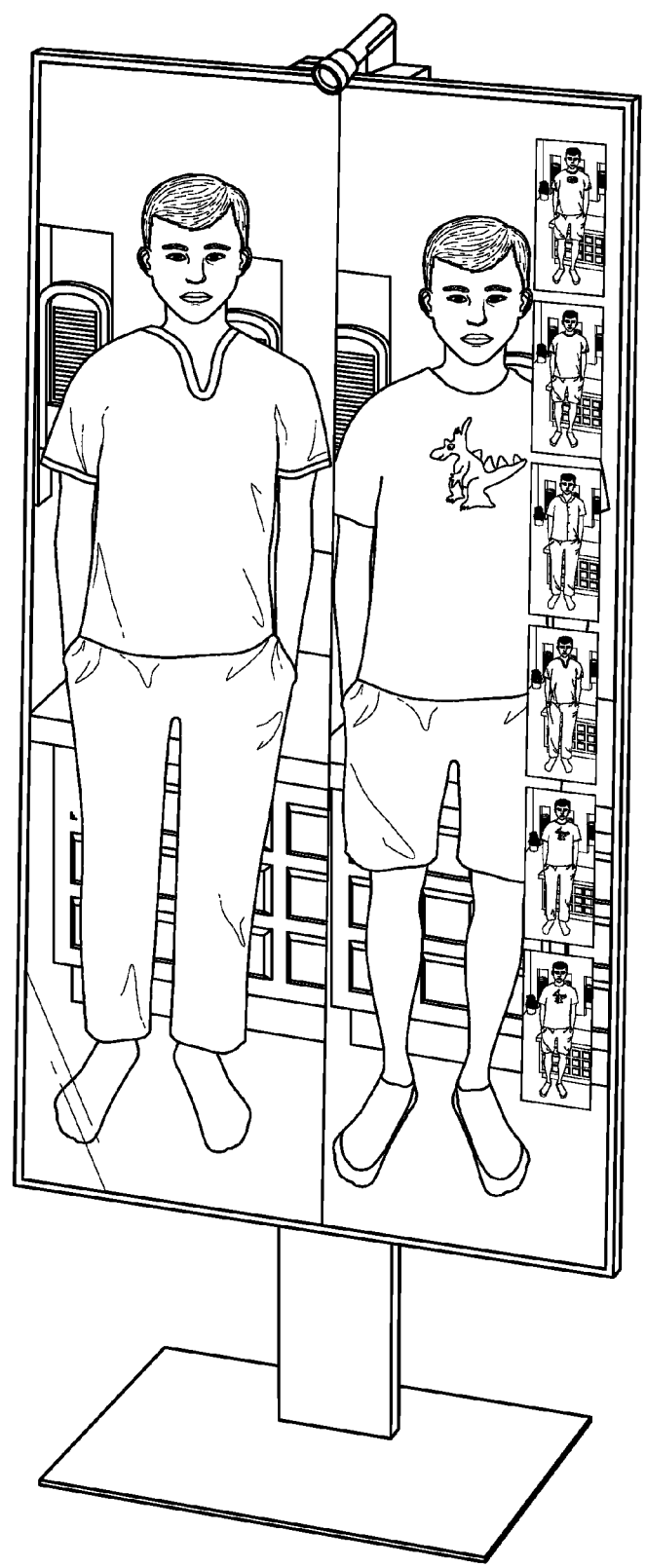
FIG. 16 illustrates an example of a virtual mirror with split screen mode and thumbnails.

FIGS. 14, 15 and 16 depict examples of a virtual mirror user interface (UI) flow that can be sequenced together to simulate a mirror experience. Outside operation hours, the mirror screen and/or the computational device that feed the screen can be turned off or remain on with a screen saver to eliminate rapid aging of the display electronics. The mirror station can be enabled so as to automatically power up. The mirror station can be controlled via remote control locally or through the cloud to reboot and to enter into normal operation.

When the system is turned on, before a user stands in front of the mirror, the system operates in an idle mode, during which the controller may or may not provide transformation to mimic a mirror reflection. Once the user enters a specified zone in front of the field of view of the camera, the processor is capable of tracking the user in the recorded image. Based on the tracking, the video engine of the processor can calculate a transformation of the image to mimic mirror behavior.

In the idle mode, normally operable when there is no user in front of the mirror, monitor may display a screen saver, a static image, video clips, and the likes. All of these examples may be referred to as idle image, wherein the term "image" includes video. During idle mode the monitor may also display the background image recorded at that particular instance by the camera. In order to properly display the background image, so that it appears like a mirror reflection, the video engine of the controller can take a default setting (e.g., 2 meter from the monitor) and apply the 2 meter transformation on the camera stream to create a mirror effect on the background environment as depicted, for example, in FIG. 14.

In various embodiments, the system is capable of autonomously recognize the presence of a user in front of the camera and automatically start mirror mimicking procedure, including user identification, account matching, etc. In one embodiment, the presence of a user is done by continuously analyzing the images captured by the camera to detect changes in the image and identify a user. In one example, a trigger zone can be designated by placing a mat or using a specific indicia on the carpet in front and within the field of view of the camera. The carpet can be designed with a specific pattern and color that improves the tracking and detection of the user. In addition, the colors of the carpet can improve the quality of the video by, e.g., improving the specific contrast. For example, lighter colors can be used to improve lighting conditions and improve the quality of the resulting video. In one embodiment, the pattern on the carpet can be alternating at around 5-10 cm with lighter and darker colors so that when a user stands with dark or light color shoes, the user shoes will be easily detected and tracked, and the maximum distance error will not be higher than half the color separation, i.e., 5-10/2. In one embodiment, the carpet can include instructions for the user informing the user how to operate the mirror. Alternatively, in one embodiment, an operation device can be provided where a user can step with their feet on a receptive pad to operate the mirror with their feet rather than their hands or voices. In one embodiment, the mirror can prompt the user to stand in the right location, e.g., when a user gets closer, the mirror can switch back to idle mode or the mirror can cut the user legs in the image, and the like.

The system can be configured so that, when the user steps into the tracking or registration zone in front of the mirror, the video engine of the controller reacts and starts tracking the object. Based on the object location, the video engine can adjust the video transformation to mimic mirror behavior. Additional input to the tracking can include the user's height, spatial location, pose and the like, as described in the EyesMatch process. At this point, the user is still not registered to the system, so an additional process of user identification can be performed. For example, the authentication can include face recognition, a special card that a user can present to the system for scanning, a user mobile device (audio, wireless, QR (Quick Response) code), or other biometric registration feature.

In one embodiment, since facial recognition is not entirely reliable 100% of the time, additional recognition features can be displayed so as to pop up on the screen for an appropriate amount of time, such as a few seconds. In the current example, a QR bracket 1505 (FIG. 15) is opened and the user can show the mirror a QR badge or QR that was sent to his unique application, e.g., on a smartphone, and effectively communicate to the system that the present facial image is associated with the authenticated user. This technique can be used to allow semi-automatic user merging in the event a particular user has more than one facial account. In addition, once facial information is merged, additional facial measurements and/or improvements can be performed to improve the recognition of the user over time. That is, when the user is authenticated using the QR code, all of the facial information associated with this specific code, from the current and all past sessions, are used to update the face recognition information for this user.

In one specific example, illustrated in FIG. 15, the image presented on the monitor includes a frame 1505 superimposed on the video image. Thus, the user looking at the monitor sees his artificial "reflection" on the monitor and the superimposed frame or bracket 1505. The user may then present a code, such that the code fits within the frame on the monitor. In one example the code is a printed barcode on a card. According to another example, the user may download an app onto the user's mobile device, e.g., a smartphone. The app includes a barcode, such as a QR code, specifically corresponding to the user or the user's smartphone. When the user sees the frame, the user opens the app and presents the smartphone such that the smartphone fits within the frame. The controller then identifies the code within the frame and thereby identifies the user.

When the user is identified, the user's account can be opened and the last recordings can be displayed, e.g., in one embodiment, a thumbnail configuration 1510 can be displayed, such as that depicted in FIG. 15. Alternatively, any other image control bar can be displayed. If the user is not identified, a user registration process can commence, then, after a few seconds, a new account can be opened and the mirror can be configured to start recording automatically. For example, if the user is not identified, a code, such as a QR can be displayed on the monitor, such that the user can scan it with a mobile device to download the app. When the app is downloaded and the user completes the registration process, the app on the user's device would include a code that can be presented to the frame in future visits.

In one embodiment, the system can record and store a video clip of N seconds, e.g., 10-13 seconds is enough time to allow the user to get a good impression on the way a particular item looks and can include, e.g., the user turning around and the like. So, while the user may continue to inspect the current item on the mirror, and the controller may continue to provide transformation for mirror mimicking, the system records only a sub-section of the entire session. This sub-session may be stored in the database, e.g., on the cloud, and be available during future sessions of the same user, be available for download onto the user's device, and/or may be available for sending by the user to other users or devices. For example, the user may be able to upload the session to social media or other applications.

In one embodiment, although the mirror can be configured to start recording automatically when it recognizes the user, if the user does not want such auto-recognition, the mirror can be configured to locally save the video, the user can trigger one of the previous thumbnails, the mirror can be configured to switch to a display mode and the mirror can be configured to play the video. That is, the user can be prompted to execute a process by which a particular scene is cut by the user and not saved in the system.

In one embodiment, one or more thumbnails 1510 can be added on the mirror, which can be useful when the screen is in a narrow configuration, e.g., 21:9, or any other wide screen configuration. In one embodiment, the thumbnail 1510 can be displayed so as to pop up in a separate bar next to the mirror stream or under the mimicked video stream. This feature can be useful when the screen is wider than required or proportioned for the mimicked mirror stream. In one embodiment, six (6) thumbnails 1510 are presented to the user, though any suitable number of thumbnails can be presented. The size of the thumbnails can be configurable to support a reasonable proportion for the display. Each thumbnail 1510 includes a hyperlink to a prior session of the user, which can be accessed by activating the hyperlink. The hyperlink may be activated by various methods, such as, e.g., hand motion, mouse, remote control, etc. In one example, the controller identifies the user's hand in the image. As the user moves the hand up and down, the controller follows the motion and highlights a corresponding thumbnail. When the user closes the user's hand to form a fist, the controller activates the hyperlink corresponding to the thumbnail that was highlighted at that particular moment.

In one embodiment, as can be seen, for example, in FIG. 15, a recording indicator 1520 can be displayed as well. The recording indicator can include display of a phrase like "REC", a red colored circle and the like.

Also, text or user's name can be displayed as shown in 1515 in FIG. 15. In one embodiment, an additional password can be associated with the user and displayed as text 1515, and the user can take this password-based authentication and apply it to the registration process. In one embodiment, an employee or the user himself can enter a phone, an email, NFC signaling or any other identification information and obtain a link to the database on the cloud on the spot or later.

In one embodiment, additional control capability can be added as well, e.g., start recording, erase video, add video effects like lightening, color changes, background selection and the like. In one embodiment, all the videos can be uploaded to the cloud and can be erased from the local station after some preprogrammed period of time. In one embodiment, the videos can be processed after recording with additional effects that improve the video or change the video to reflect augmented reality effects or for BMI/tailor/body line measurements analysis. In one embodiment, the video recording can include the audio recording of the environment for further analysis. In one embodiment, the video recording can include WLAN recording of the environment to record the MAC of the users and later on with further correlation, can be adapted to associate the MAC of the mobile device to the user.

The present invention includes a system for facilitating a user's control of the mirror. In one embodiment, if the user is still in the predefined zone and was recognized by the mirror once, as long as he is still standing there and no one else is being recognized, the user will be able to control the mirror, e.g., play, start and stop images/videos, delete images/videos, add augmented reality features and the like. The user can also control the mirror through gesture control or from his device, e.g., smartphone, through a dedicated application or additional control features as part of the retail application. In one embodiment, the gesture control can enable some basic functionality and the user application can be allowed to enable much more functionality relative to the gesture control. In one embodiment, the assistant in the store or an assistant available virtually/remotely in the cloud can assist the user in operating the mirror. In one embodiment, the user can set his own preferences for the UI from his application or from the web. All user dedicated settings can be added to the user's account, e.g., the user can change the time length of a session recording, the number of thumbnails, and the like.

In a default mode, the user can see his last n videos. The videos may or may not have been taken in the specific mirror location, but may be accessed at a central storage location, e.g., from the cloud. The user can set the appearance of the thumbnails of the local try-on videos. From his application, the user can see all the thumbnails and be able to touch them or any other election method to activate play of the video associated with the specific thumbnail.

In one embodiment, the thumbnails 1510 are configured so as to pop up on top of the mimicked mirror stream as can be seen, for example, in FIG. 15. The thumbnails can be sent to the background when the real-time mirror-mimicking video is playing or in split mode when there is no gesture control identification as shown, for example, in FIG. 16. The user can also set the screen to a split mode as shown, for example, in FIG. 16. Specifically, FIG. 16 depicts a side-by-side setting where the user can still see himself in real-time on one side of the screen and can play previously recorded videos on the other half.

In one embodiment, the remote control of the user can obtain the identified user information automatically so the store assistant can send the user link to his account for registration or to help the user with additional capability like changing clothes colors or changing clothes in general.

In one embodiment, the user can use his mobile device to initiate a video call in the mirror with a remote expert or a friend that can advise him in real time. The call can be from a dedicated application or any other third-party application like Skype. The mirror video stream can be fed to the local Skype and the remote user can get the mirror stream in real time. For example, the real-time or stored mirror-mimicking video can be send to the user's device using, e.g., WiFi connection. The app then enables coupling the downloaded or streamed video to the communication app, such as Skype. On the other hand, the app may enable to user to send a link via, e.g., email or SMS, to enable a third party cloud access to the streaming mirror-mimicking video in real time.

Figure 17:
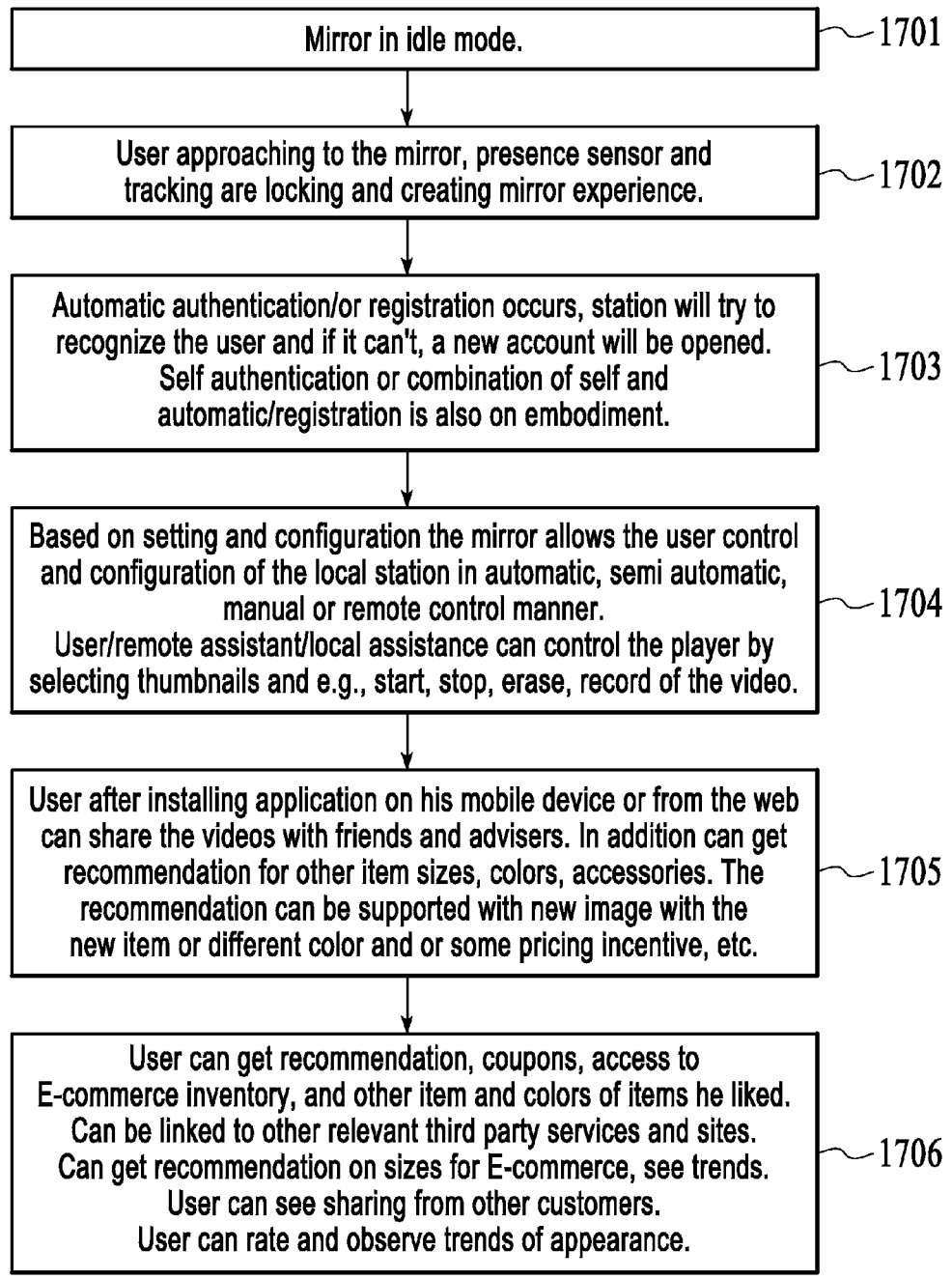
FIG. 17 illustrates an embodiment of user flow of usage.

FIG. 17 depicts one embodiment of a suggested flow of usage. Specifically, FIG. 17 depicts an embodiment of user flow of usage of the additional embodiments depicted in FIGS. 14, 15 and 16 and their associated descriptions. In step 1701 the mirror is in idle position, during which time an idle image is presented on the monitor. The idle image may be, e.g., a screen saver, commercials, slide show, or just an image of the field of view in front of the camera and transposed by the controller to mimic a mirror reflection of the field of view.

In step 1702, as a user approaches the mirror and the user's presence is sensed, e.g., by motion sensor or by detecting a change in the image seen by the camera, the system initiates operation in mirror mode. That is, the controller perform transformation operation on the image of the user, such that the image presented on the monitor mimics the user's reflection in a mirror. At step 1703, the system initiates authentication procedure to identify and authenticate the user. For example, in one embodiment the system uses face recognition to identify and authenticate the user, while in another embodiment the user may be authenticated using a device such as a smartphone with capabilities such as, WiFi, Bluetooth, NFC, etc. For example, in one embodiment face recognition is used to identify the user, but a second step, e.g., use of QR code is used to authenticate the user. If the user has not been identified, e.g., it is a new user, the user may be prompted to open an account. For example, a QR code may be presented on the monitor, enabling the user to scan the QR code using a mobile device, to thereby download an app to the user's device. Otherwise, or if the user declines to open an account, the user may proceed as a guest, albeit some features, such as remote access to stored images, may not be available by guest access.

In step 1704 the user is given user control over the display. In one embodiment, the specific control preferences are saved for each particular user and are activated once the user has been recognized. Otherwise, general user interface is enabled, e.g., a hand gesture activated interface. In one embodiment, when a user has been recognized, or has tried on several outfits in the same session, prior trials are presented as thumbnails on the side of the main display. When the user raises the hand corresponding to the side of the thumbnails, depending on the height of the hand, a corresponding thumbnail is highlighted for selection. As the user raises or lowers the hand, another thumbnail corresponding to the height of the hand is highlighted for selection. Then, when the user closes his fist, the highlighted thumbnail is selected and the corresponding image or video is displayed on the main screen.

As shown in 1705, the images and video of each session may be stored on the cloud, and may be accessible remotely using, e.g., smartphones, tablets, etc. Thus, a user may converse with friends remotely and get their opinion on the outfit the user is trying. For example, the user may send the friend a link to the recorded trial or to a live streaming video from the system. Thus, the user may share the shopping experience with people located remotely.

Moreover, as also shown in 1705, since the system is able to identify the user and also calculate parameters of the user, e.g., weight, height, etc., the system may be able to access a database of available items that would be recommended to the user based on these parameters. More specifically, if the user has recorded two trials of two different shirt within the same session, the system can decipher that the user is interested in purchasing a shirt and make either alternative recommendations, i.e., different shirts, or complimentary recommendations, e.g., specific pants that go well with the tried on shirts. Also, since the system can identify the shirt and the brand of the shirt, it may be able to offer specific incentive from that manufacturer, as exemplified in 1706.

Also, in 1706 the user may be offered the ability to change colors without having to actually change the garment. As explained above, by the use of multiple masks or layers, the system is able to change the color of the article, while maintaining the realistic visual effect of the fabric as it is worn by the user. Since the system may maintain a layer of shading, a layer of texture, a layer of reflection, etc., the color layer may be changed while maintaining all the other layers, such that the rendered image retains all of the characteristics of the prior image, with only the color changed.

In order to avoid complication of the flow of the experience in front of the mirror, a complimentary application can enable additional features and settings, e.g., an advanced user that is comfortable with gesture control can enable more gestures that will help to operate advanced features without use of a tactile interface application. For users that are not comfortable with hand gestures, such users can be provided with basic automated features and the mobile application can be used to operate the other advanced functionality.

In one embodiment, the mirror station can be configured to identify the user's behavior and adapt the gesture control to the way the user is trying to operate it, e.g., some users will point, some users will grab, and some users will push to operate a thumbnail. The system can be adapted to learn and update a profile control per user.

In one embodiment, the mirror station can support instruction to the user, so that when the system identifies a user that is not controlling the mirror in the correct manner, a short explanation can pop up and guide the user through the process.

In one embodiment, the mirror can be adapted to demonstrate predetermined characteristics based on information regarding the user's familiarity with the system, e.g., based on whether the user is a first time user, based on the number of videos in the system for the user, based on the last time the user required the system to enable instructions, can be adapted to provide relatively simpler functionality voice assistance, can be adapted to provide remote expert assistance and the like.

In one embodiment, the concept of a pre-defined number of thumbnails, as shown in FIGS. 15 and 16, can be replaced with a slide menu of thumbnails.

In the normal operation mode as depicted, for example, in FIGS. 15 and 16, the user can move his hands up and down to select thumbnails, once the user's hand stops, the closest thumbnail can be elected and can be designated such that the user will get feedback for the selection. For example, blue shade can be provided around the selected thumbnail to signify its election. When the user grabs, pushes, or points his hands/fingers at the thumbnail, the video can start playing based on the display mode setting, and the user can also stop the video and perform other operations and the like. Once the user, for example, stops the played video, a hold bar can be displayed on the thumbnail to designate the status of the played video and to acknowledge back to the user that his command was accepted by the mirror station.

In one embodiment, to simplify the operation further, the gesture control by hand can be configured to detect a jump between a thumbnail even if the user is moving his hands left and right instead of up and down or any other direction. The system can be configured to adapt itself to the user's span and velocity of hand movements, so that the user can see the election so he can adapt his speed and span of movement as well.

The embodiments may be implemented in a non-transitory computer-readable storage medium for operating a monitor, a camera, and a processor, so as to display a mirror-mimicking image on the monitor, comprising: on a device having the processor and a memory storing a program for execution by the processor, the program including instructions for: sensing for a user; initiating a mirror-mimicking mode for displaying the mirror-mimicking image on the monitor; initiating an authentication process; and prompting the user to control the monitor.

Augmented Merchandizing

The mirror system can be used to provide augmented merchandizing by enabling better service to users, promoting merchandize, and providing feedback to merchandizers. The mirror can be configured to complement and augment the business process. Since the mirror station according to the present invention is a new device in the marketplace, uses of the mirror to create a revenue stream is unique as well. The next few embodiments include details providing examples as to how an active mirror can be used to augment the business and to create new a revenue streams.

For example, in one embodiment, the logo of a specific brand or partner or any other logo can be added to the recorded video, so the user will get, e.g., video with the logo of the brand, and the user can share the resulting video with his friends. Consequently, a single session in front of the system may be used to promote a certain item and/or brand. For example, if the user uploads the session to a social network site, the session may be seen by many people, all of who would be exposed to the superimposed logo.

In one embodiment, the mirror can be configured to provide convincing augmented reality capability by an item that was previously tried on by another user with a similar body type. This matching technique yields a much more convincing experience and provides better recommendations to the user.

The mirror can insert commercials, coupons and logos into the mirror in idle mode, within a specified portion of the mirror, or via split screen mode. The mirror can also introduce commercials, coupons and logos into recorded videos so a user can view the video with the commercial/coupon/logo. These displays can be sold as advertising. The user can share the commercial/coupon/logo by e.g., uploading a session to social network sites. The user can be offered an incentive in exchange for sharing the commercial/coupon/logo.

The user's try-on session of clothing can be analyzed for measurements and/or characteristics such as BMI, sex, origin, age, body measurements, facial expression, voice expression, recommended sizes and the like. This data can be incorporated into ecommerce applications. This data is of high value and can be shared with brands, the user, a third party based on an agreement with the user and the brands, etc. Utilizing the present invention, a revenue stream can be generated from the analyzed data regarding the user, for example, by presenting the user with focused and accurate advertising according to recorded sessions.

The mirror can be configured as a service that allows a user to engage experts, a friend or an advisor when the user contemplates a particular purchase. Additional revenue can be generated using the present invention by promoting up sale opportunities related to the advice of the remote expert. The experts can be rated by the user, and user can pick his own favorite expert or select an expert designated by the brand.

The user can be presented with a display including a suggestion and/or incentive for a particular item tried on by the user, for example, with different colors. This method presents a further opportunity to promote up-selling. Augmented reality can be used to promote up-sales. Specifically, based on information obtained by the mirror and other user tries, a more compelling augmented reality display can be generated based on a combination of information about the user and similar users that have a similar body type.

In one embodiment, the social network of the user can be integrated in a manner to help the user and/or comment on the user's contemplation of the item. The system can be configured to share the user's videos. The social networking features can be used to enlarge the database of addressable customers.

In one embodiment, the user can upload their own photos, the video engines can be configured to process the images and provide similar analysis of BMI, face, origin and the like. The system can provide recommended sizes for ecommerce applications. The system can show the item that was bought in different colors. In this manner, the mirror can be used to obtain marketing information for an appropriate database even when the user isn't physically standing in front of the mirror itself.

In one embodiment, the user can see his predicted size in the application and update the measurements, which can be used to improve the size prediction model and include adjustments for particular brands.

Physical Design

The present invention includes the mechanical design and appearance design of the equipment. The screen can be mounted so as to stand on the wall either vertically or horizontally or can be switchable between vertical and horizontal (by a larger or similar mechanical solution, the screen can be tilted, rotated and the like). The screen can be mounted on a dedicated stand, mounted on a wall or mounted behind the wall. When the screen is inside the wall, thermal ventilation duct should be provided to support the screen and the computing device.

In one embodiment, the screen can have a proportion of a mirror, e.g., 21:9.

In one embodiment, the screen can have a regular proportion, i.e., 16:9, and the setting of the display can be split screen or dark bars on the sides to yield the mirror proportion, i.e., 21:9.

In one embodiment, the screen can come in a matte finish to eliminate reflections that can be seen on dark colors. In other words, when the user wears black, and the screen is not matte-finished, the user can see his own true mirror reflection; this effect is not wanted and can diminish, distort or completely ruin the virtual mirror effect.

The frame can be presented in a manner as depicted in FIGS. 14, 15 and 16. A minimal frame can be used or the frame can be hidden behind a wall.

In one embodiment, the cameras or the controlled cameras can be located in the frame. The camera can be mounted above the screen frame, can be hidden and can be mounted on the wall. The camera can be provided with a shade that can be filtered out from the image. Since the camera is facing down, a cover that will hide most of the camera body can block the view from a distance.

The screen can be LED, LCD, plasma, glass, projector and the like.

A background can be used that enables better white balancing that results in higher quality videos.

Lighting can include a combination of white, yellow or any combination in a spot or a projector combination and can be configured to improve the video quality and the colors.

A dedicated carpet can be used to allow background changes, to define a user zone, to improve user detection and tracking in front of the mirror, to instruct the user where to stand and to instruct the user on how to operate the mirror.

CONCLUSION

Each of the above identified modules or programs corresponds to a set of instructions for performing a function described above. These modules and programs (i.e., sets of instructions) need not be implemented as separate software programs, procedures or modules, and thus various subsets of these modules may be combined or otherwise re-arranged in various embodiments. In some embodiments, memory may store a subset of the modules and data structures identified above. Furthermore, memory may store additional modules and data structures not described above.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

Computing devices typically include a variety of media, which can include computer-readable storage media and/or communications media. Computer-readable storage media generally can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media, e.g., stored on a server coupled to the cloud.

The foregoing description, for purpose of explanation, has been described with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles of the aspects and its practical applications, to thereby enable others skilled in the art to best utilize the aspects and various embodiments with various modifications as are suited to the particular use contemplated.

We claim:

1. A computer implemented method for operating a system having a monitor, a camera, a memory, and a processor, so as to display a mirror-mimicking image on the monitor to enable a user to try a clothing item, comprising a program for execution by the processor, the program including instructions for:
   at each clothing item try session performing the steps:
   obtaining digital images of a live video feed of length of N seconds from the camera;
   flipping the images about a vertical axis so as to reverse right and left sides of the image;
   applying a transformation mapping to the images to modify the images such that they appear to mimic a reflection of a mirror, to thereby obtain transformed images;
   saving the transformed images in the memory;
   displaying the transformed images on the monitor to thereby replay the video feed of N seconds using the transformed images;
   wherein the length of N seconds is configured to be enough time to allow the user to get a good impression on the way the clothing item looks.

2. The method of claim 1, further comprising enabling the user to stop the replay of the video.

3. The method of claim 1, further comprising storing on the cloud the transformed images of the video of each session.

4. The method of claim 3, further comprising enabling remotely accessing the transformed images of the video stored in the cloud.

5. The method of claim 1, further comprising enabling the user to send a link to the video stored in the cloud.

6. The method of claim 1, further comprising enabling the user to stream the video using the transformed images from the cloud.

7. The method of claim 1, wherein the length of N seconds is configured to be enough time to allow the user to turn around.

8. The method of claim 1, further comprising instructions for at least one from the group consisting of: changing a background of the image or video; changing the appearance of an object of clothing or apparel worn by the user with a selectable virtual object; and adding an accessory to the appearance of the user.

9. The method of claim 1, wherein the program further comprising instructions for when the user steps into a tracking/registration zone in front of the monitor, start tracking the user.

10. The method of claim 1, wherein the program further comprising instructions for generating a model mask to enable changing a color of the clothing item.

11. The method of claim 10, wherein the model mask comprises a plurality of layers, having at least color layer and texture layer.

12. The method of claim 11, wherein the model mask further comprises a grey scale mask of the clothing item.

13. The method of claim 1, wherein the program further comprising instructions for generating a split screen on the monitor where the user can see himself in real-time on one side of the screen and can play previously recorded videos on the other half.

14. The method of claim 1, wherein the transformation is configured to match the camera point of view with a theoretical mirror point of view.

15. The method of claim 1, wherein the obtaining digital images commences upon sensing a trigger event.

16. The method of claim 1, further comprising restarting the play of the video feed according to a user input.

17. The method of claim 1, wherein the program further includes instructions for erasing the stored video from the local storage after a preprogrammed period of time.

18. A system for enabling a user to try a clothing item, comprising:
   a monitor;
   a camera generating digital images;
   a processor comprising a video engine;
   a trigger event module;
   wherein the processor is configured to, upon receiving a trigger event, obtaining the digital images of a video of length of N seconds from the camera, the length of N seconds is configured to be enough time to allow the user to get a good impression on the way the clothing item looks;
   and wherein the video engine is configured to apply a transformation to the digital images of the video feed so as to replay the video feed of N seconds using the transformed images;
   a memory for storing the transformed images.

19. The system of claim 18, wherein the trigger event module comprises a trigger zone designated in front and within the field of view of the camera.

20. The system of claim 18, wherein the system is configured to record only a sub-section of an entire session of an item try by the user.

21. The system of claim 20, wherein the sub-session is stored on the cloud, and made available for download onto the user's device.

22. The system of claim 21, wherein the sub-session is made available for sending by the user to other users or devices.

* * * * *